(12) United States Patent
Uedaira

(10) Patent No.: US 12,631,759 B2
(45) Date of Patent: May 19, 2026

(54) LIGHT DETECTION DEVICE AND LIGHT DETECTION SYSTEM HAVING TWO OR MORE SENSORS

(71) Applicant: ROHM CO., LTD., Kyoto (JP)

(72) Inventor: Yoshitsugu Uedaira, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 183 days.

(21) Appl. No.: 18/429,567

(22) Filed: Feb. 1, 2024

(65) Prior Publication Data

US 2024/0393467 A1 Nov. 28, 2024

(30) Foreign Application Priority Data

Mar. 2, 2023 (JP) ................................. 2023-032175

(51) Int. Cl.
*G01S 17/95* (2006.01)
*G01J 1/42* (2006.01)
*G01S 7/481* (2006.01)
*G01S 17/04* (2020.01)

(52) U.S. Cl.
CPC ............. *G01S 17/95* (2013.01); *G01J 1/4204* (2013.01); *G01S 7/4813* (2013.01); *G01S 17/04* (2020.01)

(58) Field of Classification Search
CPC ........ G01S 17/95; G01S 7/4813; G01S 17/04; G01S 17/931; G01S 17/86; G01J 1/4204; H10F 77/50; H10F 19/80; H10F 19/00
See application file for complete search history.

(56) References Cited

U.S. PATENT DOCUMENTS

| | | | | |
|---|---|---|---|---|
| 5,955,854 A * | 9/1999 | Zhang | ................... | E05F 15/431 |
| | | | | 340/901 |
| 2015/0179830 A1* | 6/2015 | Sugiura | ................. | H10F 77/413 |
| | | | | 257/432 |
| 2016/0076934 A1* | 3/2016 | Low | ....................... | H04N 23/45 |
| | | | | 250/208.1 |
| 2018/0343367 A1* | 11/2018 | Darvas | ................... | G01S 3/784 |
| 2020/0044112 A1* | 2/2020 | Tsou | ....................... | H10F 77/50 |
| 2020/0371270 A1* | 11/2020 | Mirassou | ................. | G01V 8/22 |
| 2022/0091261 A1* | 3/2022 | Kubota | ................. | G01S 7/4863 |

FOREIGN PATENT DOCUMENTS

| | | | | |
|---|---|---|---|---|
| JP | 2016022757 A | 2/2016 | | |
| KR | 20220023158 A * | 3/2022 | ........... | G01S 7/4814 |

* cited by examiner

*Primary Examiner* — Georgia Y Epps
*Assistant Examiner* — Erin R Garber
(74) *Attorney, Agent, or Firm* — HSML P.C.

(57) ABSTRACT

A light detection device, includes: a substrate; sensors provided on the substrate; a light transmitting body made of a light transmitting resin and covering the substrate and the sensors; and a light shielding body covering a periphery of the light transmitting body with a shape that shields light and including an opening facing the substrate, wherein the sensors are on a substrate surface at positions to receive light entering the light transmitting body from outside the light shielding body through the opening, and the sensors include at least two sensors among: a first illuminance sensor detecting illuminance according to light received from a certain direction at the substrate surface; a second illuminance sensor detecting illuminance according to light received from a wider direction than the first illuminance sensor; a solar radiation sensor detecting solar radiation according to received light; and a rain sensor detecting rain according to received light.

15 Claims, 18 Drawing Sheets

LIGHT DETECTION DEVICE AND LIGHT DETECTION SYSTEM HAVING TWO OR MORE SENSORS

CROSS-REFERENCE TO RELATED APPLICATION

This application is based upon and claims the benefit of priority from Japanese Patent Application No. 2023-032175, filed on Mar. 2, 2023, the entire contents of which are incorporated herein by reference.

TECHNICAL FIELD

The present disclosure relates to a light detection device and a light detection system.

BACKGROUND

In the related art, there is known an example in which a plurality of types of sensors equipped with light receivers, such as a solar radiation sensor that detects an intensity of solar radiation and a rain sensor that detects an amount of rain, are provided at different positions in a vehicle.

BRIEF DESCRIPTION OF DRAWINGS

The accompanying drawings, which are incorporated in and constitute a part of the specification, illustrate embodiments of the present disclosure.

FIG. 2 is a side view showing an internal configuration of the light detection system according to the first embodiment.

FIG. 9 is a diagram showing a configuration of a light detection system according to a third embodiment.

DETAILED DESCRIPTION

Figure 1:
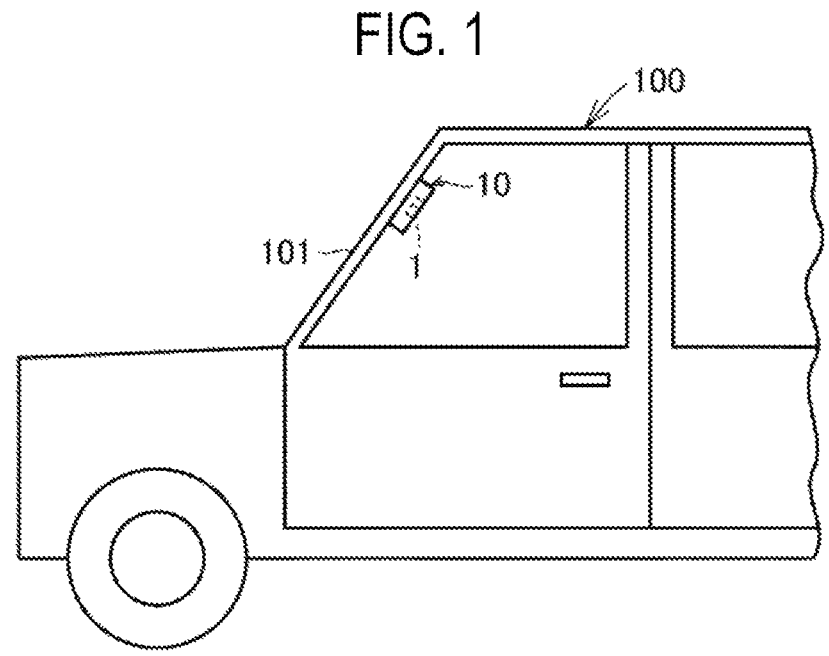
FIG. 1 is a diagram showing an installation example of a light detection device and a light detection system according to a first embodiment.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Embodiments of the present disclosure will be described in detail below with reference to the drawings. In addition, the same or equivalent parts in the drawings are designated by like reference numerals, and the description thereof will not be repeated in principle. Although a plurality of embodiments will be described below, it has been planned at the time of filing this application to appropriately combine the configurations described in the respective embodiments.

In first to seventh embodiments described below, light detection devices and light detection systems will be described with reference to FIGS. 1 to 18. Specifically, in the first to seventh embodiments, light detection devices 1 and 1A in which a plurality of sensors are provided on one substrate, light detection systems 10 and 10A including the light detection devices 1 and 1A, and the like will be described.

The light detection devices 1 and 1A according to the following first to seventh embodiments may include at least two sensors among a plurality of sensors including a solar radiation sensor, a front end sensor, an illuminance sensor, and a rain sensor, which will be described later. For example, the light detection devices 1 and 1A may have a configuration in which any two of the plurality of sensors are provided, a configuration in which any three of the plurality of sensors are provided, or a configuration in which any four of the plurality of sensors are provided.

First Embodiment

[Configuration of Light Detection System 10]

FIG. 1 is a diagram showing an installation example of a light detection system 10 including a light detection device 1 according to a first embodiment. In the example of FIG. 1, a side view of a vehicle 100 is shown. FIG. 1 shows a configuration in which the light detection system 10 is installed at an inner side of a windshield 101, which is a window of a vehicle 100, such as an automobile.

The light detection system 10 includes the light detection device 1 in which a plurality of sensors are provided on one substrate. The plurality of sensors provided in the light detection device 1 include a rain sensor that detects rain according to received light, an illuminance sensor that detects illuminance according to received light, and a solar radiation sensor that detects solar radiation according to received light. The plurality of sensors may include the rain sensor and at least one selected from the group of the illuminance sensor and the solar radiation sensor. Further, the plurality of sensors may include the illuminance sensor and the solar radiation sensor as two sensors.

Figure 2:
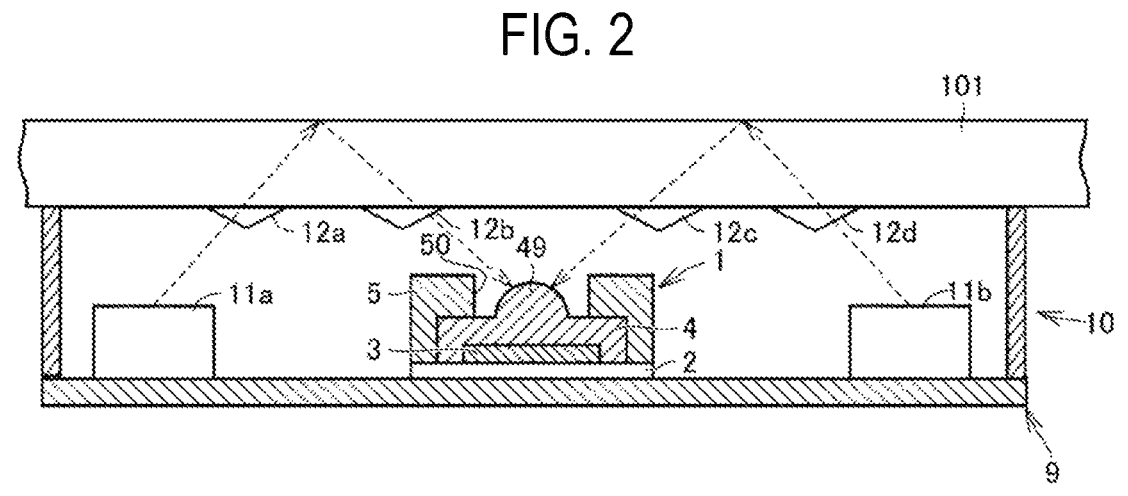
Figure 3:
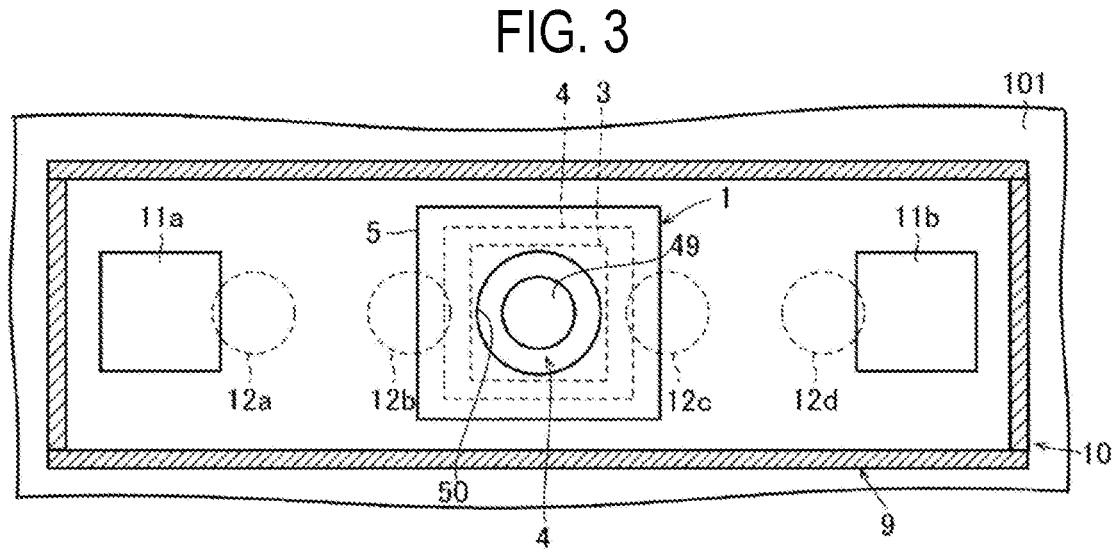
FIG. 3 is a plan view showing the internal configuration of the light detection system according to the first embodiment.

FIG. 2 is a side view showing an internal configuration of the light detection system 10 according to the first embodiment. FIG. 3 is a plan view showing the internal configuration of the light detection system 10 according to the first embodiment.

FIG. 2 shows the internal configuration of the light detection system 10 attached to the windshield 101, which is viewed from above the vehicle 100. In FIG. 2, in order to clarify the internal configuration of the light detection device 1, a cross-sectional view is shown except for a bottom plate 2 and light emitters 11a and 11b.

FIG. 3 shows the configuration of the light detection system 10 attached to the windshield 101, which is viewed from outside the windshield 101. In FIG. 3, some parts of the light detection system 10 are shown in dashed lines for clarity of illustration of the configuration.

The configuration of the light detection system 10 will be described below with reference to FIGS. 2 and 3. In the following description, the configuration will be described with the light detection system 10 placed horizontally. Therefore, the expression "vertical direction" used herein means a vertical direction when the light detection system 10 is placed horizontally. Thus, an upper side of the substrate 3 means a front side of a surface of the substrate 3.

In the light detection system 10, the light detection device 1, the plurality of light emitters 11a and 11b, and a plurality of lenses 12a, 12b, 12c and 12d are provided inside a housing 9.

The plurality of light emitters 11a and 11b are light emitters equipped with LEDs that emit infrared light used by the rain sensors (rain sensors 36 and 37 in FIG. 4) of the light detection device 1 to detect rain. The plurality of lenses 12a, 12b, 12c and 12d are lenses used by the rain sensors (rain sensors 36 and 37 in FIG. 4) of the light detection device 1 to detect rain or raindrops. The plurality of lenses 12a, 12b, 12c and 12d mainly have a function of reflecting light such as infrared rays, as described later, but other optical elements may be used in addition to lenses, as long as they have a function of reflecting light as described later.

The rain sensor is an optical sensor that detects a rain condition according to an amount of the infrared light, emitted from a light emitter such as the light emitter 11a or 11b, which enters the windshield 101 and then is reflected by the windshield 101. The rain sensor is arranged at a position where it is able to receive the infrared light reflected by the windshield 101 when there is no rain on the windshield 101. In the rain sensor, when rain or raindrops adhere to the windshield 101, the amount of the infrared light reflected by the windshield 101 decreases compared to when no rain or raindrops adhere to the windshield 101 and accordingly, the amount of the infrared light to be detected by the rain sensor is reduced. The reason for this is that when rain or raindrops adhere to the windshield 101, an amount of the infrared light that exits from the windshield 101 is greater than when no rain or raindrops adhere to the windshield 101. Therefore, the rain sensor is able to detect the rain condition by detecting the amount of the infrared light reflected by the windshield 101.

The lenses 12a, 12b, 12c and 12d are lenses used by the rain sensors (rain sensors 36 and 37 in FIG. 4) of the light detection device 1 to detect rain. The plurality of lenses 12a, 12b, 12c and 12d are provided on a transparent plate-shaped lens support body (not shown). Each of the lenses 12a, 12b, 12c and 12d is a conical lens. Each of the lenses 12a, 12b, 12c and 12d is provided in such a manner that it protrudes toward an internal space of the housing 9. In the light detection device 1, in addition to the lenses 12a, 12b, 12c and 12d, a triangular prism-shaped lens may be used as a lens through which the infrared light is transmitted.

Inside the housing 9, the light detection device 1 and the plurality of light emitters 11a and 11b are provided on a bottom surface and are spaced apart from each other. On the bottom surface inside the housing 9, the light detection device 1 is provided at a center of the bottom surface. On the bottom inside the housing 9, the light emitter 11a is provided near one end of the light detection device 1, and the light emitter 11b is provided near the other end of the light detection device 1.

Each of the lenses 12a, 12b, 12c and 12d is provided such that a protruding surface thereof faces the light detection device 1, the light emitters 11a and 11b, and the like. The lenses 12a and 12b are located above the region between the light emitter 11a and the light detection device 1. The lenses 12c and 12d are located above the region between the light emitter 11b and the light detection device 1.

The light detection device 1 includes a bottom plate 2, a substrate 3, a light transmitting body 4, and a light shielding body 5. The substrate 3 is a circuit board on which a plurality of types of optical sensors are mounted. The light transmitting body 4 is a molded member that seals the substrate 3 and various optical sensors provided on the substrate 3 with a transparent synthetic resin. The light shielding body 5 is a molded member that is formed around an outside of the light transmitting body 4 to cover a periphery of the light transmitting body 4 with a light shielding synthetic resin except for an upper surface of the light transmitting body 4. Thus, the substrate 3 is doubly molded with the light transmitting body 4 and the light shielding body 5. The light shielding body 5 may be a member partially or entirely made of metal that has a light shielding function.

Figure 4:
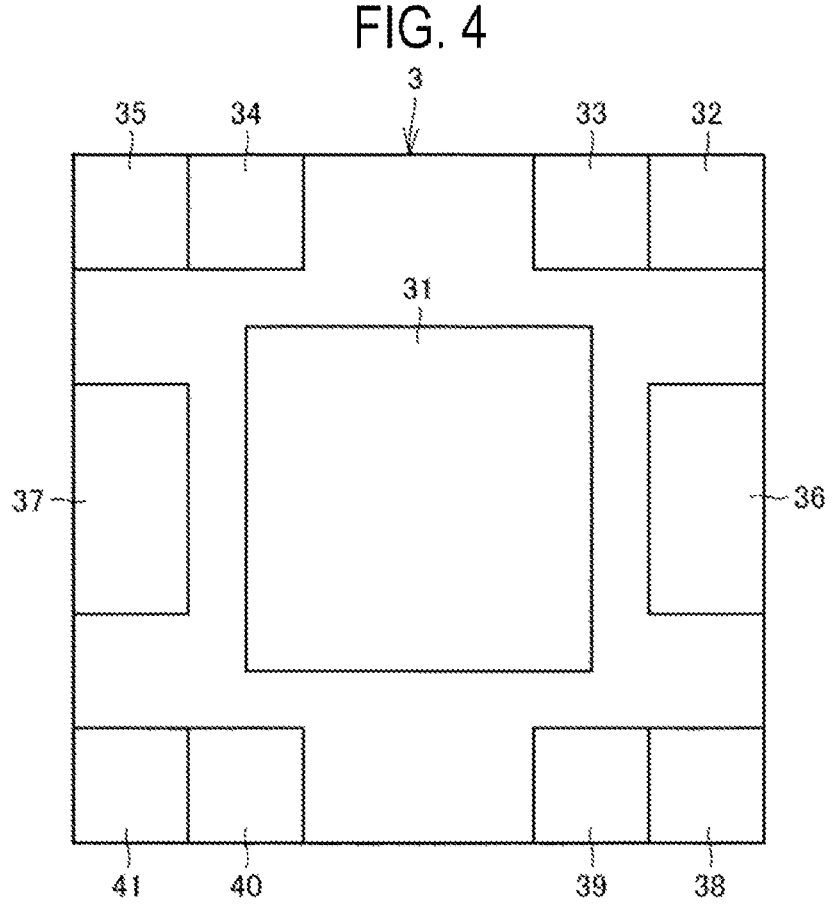
FIG. 4 is a plan view of a substrate showing an example of arrangement of various sensors on the substrate of the light detection device according to the first embodiment.

The bottom plate 2 is a rectangular plate member larger in size than the substrate 3. The substrate 3 is a rectangular plate member attached to the bottom plate 2. A plurality of optical sensors are provided on the substrate 3, as shown in FIG. 4.

The light transmitting body 4 is formed to cover side surfaces and an upper surface of the substrate 3. A convex-lens-shaped lens portion 49 is provided at a center of the upper surface of the light transmitting body 4 and protrudes upward.

The light shielding body 5 is formed on the outside of the light transmitting body 4 so as to cover side surfaces of the light transmitting body 4 and a portion of the upper surface excluding a central portion. In the light shielding body 5, a circular opening 50 is provided above the central portion of the upper surface of the light transmitting body 4.

The opening 50 has a circular shape with a diameter set such that the lens portion 49 of the light transmitting body 4 and a portion of a peripheral region of the lens portion 49 are visible from above. The diameter of the opening 50 is larger than a diameter of the lens portion 49. The diameter of the opening 50 is equal to a length of one side of the substrate 3. The diameter of the opening 50 may be equal to the length of one side of the substrate 3, or may be different from the length of one side of the substrate 3. A thickness of the opening 50 is thicker than a thickness of the lens portion 49. The lens portion 49 is a semicircular lens-shaped structure that protrudes into the opening 50 in the light shielding body 5. The opening 50 is provided at a position where the opening 50 faces a substrate surface of the substrate 3.

Due to such a light shielding body 5, in the light detection device 1, it becomes impossible to detect light from side surfaces of the light shielding body 5 and light from portions other than the opening 50 on an upper surface of the light shielding body 5 by the plurality of optical sensors on the substrate 3. On the other hand, in the light transmitting body 4, an upper side of the lens portion 49 and an upper side of the portion of the peripheral region of the lens portion 49 are not shielded from light due to the presence of the opening 50 in the light shielding body 5. Therefore, in the light detection device 1, light is incident into an interior through the lens portion 49 in the light transmitting body 4 and the portion of the peripheral region of the lens portion 49. In the light detection device 1, it becomes possible to detect the light incident in this manner by the plurality of optical sensors on the substrate 3.

Further, the lens portion 49 is shaped to protrude upward, and is capable of collecting a large amount of light coming from above the light detection device 1 and sending the light to the plurality of sensors on the substrate 3. The light detection device 1 may also have a structure in which the lens portion 49 is not provided.

The lenses 12a and 12b are arranged so that as indicated by a dashed line arrow in FIG. 2, when there is no rain or raindrops adhering to the windshield 101, the infrared light generated by light emission from the light emitter 11a is allowed to pass through the lens 12a to be reflected by the windshield 101, and then pass through the lens 12b to be incident on the light transmitting body 4. The lens 12a transmits the infrared light generated by the light emission of the light emitter 11a so that the infrared light is incident on the windshield 101 at an optimal angle for detecting rain. The lens 12b transmits the infrared light so that the infrared light incident on the windshield 101 through the lens 12a and reflected by the windshield 101 enters the light transmitting body 4 at an optimal angle for reaching the light detection device 1.

The lenses 12c and 12d are arranged so that as indicated by a dashed line arrow in FIG. 2, the infrared light generated by light emission from the light emitter 11b is allowed to pass through the lens 12d to be reflected by the windshield 101, and then pass through the lens 12c to be incident on the light transmitting body 4. The lens 12d transmits the infrared light generated by the light emission of the light emitter 11b so that the infrared light is incident on the windshield 101 at an optimal angle for detecting rain. The lens 12c transmits the infrared light so that the infrared light incident on the windshield 101 through the lens 12d and reflected by the windshield 101 enters the light transmitting body 4 at an optimal angle for reaching the light detection device 1.

[Arrangement of Various Sensors on the Substrate 3 of the Light Detection Device 1]

FIG. 4 is a plan view of the substrate 3 showing an example of arrangement of various sensors on the substrate 3 of the light detection device 1 according to the first embodiment. In FIG. 4, the substrate 3 is shown to correspond to an up-down direction (vertical direction) and a left-right direction (horizontal direction) when the light detection device 1 attached to the windshield 101 is viewed from a front side. In a state in which the light detection device 1 is attached to the windshield 101 in this manner, directions in the following description will be described in terms of the up-down direction and the left-right direction.

On the substrate surface of the substrate 3, a plurality of optical sensors, such as an illuminance sensor 31, rain sensors 36 and 37, and solar radiation sensors 32, 33, 34, 35, 38, 39, 40 and 41, are arranged. The plurality of optical sensors are arranged in a way that allows the sensors to receive light from necessary directions according to detection functions of each of the sensors, among light incident on the light transmitting body 4.

The illuminance sensor 31 is attached to a center of the substrate 3. On the substrate 3, the rain sensors 36 and 37 are provided on both left and right sides of the illuminance sensor 31 at positions distanced apart from the illuminance sensor 31. Specifically, the rain sensors 36 and 37 are arranged at positions where they are able to receive the infrared light reflected by the windshield 101 when there is no rain or raindrops adhering to the windshield 101. The rain sensors 36 and 37 are mounted on both left and right ends of the substrate 3 at symmetrical positions with respect to a line passing through the center of the substrate 3 in the up-down direction.

On the substrate 3, the solar radiation sensors 32, 33, 34 and 35 and the solar radiation sensors 38, 39, 40 and 41 are provided on both upper and lower sides of the illuminance sensor 31 at positions distanced apart from the illuminance sensor 31. These sensors are composed of light receivers such as photodiodes, for example. Specifically, the solar radiation sensors 32, 33, 34 and 35 and the solar radiation sensors 38, 39, 40 and 41 are mounted on both upper and lower ends of the substrate 3 at positions vertically symmetrical with respect to a line passing through the center of the substrate 3 in the left-right direction.

The solar radiation sensor 32 is mounted on an upper right end of the substrate 3. The solar radiation sensor 35 is mounted on an upper left end of the substrate 3. The solar radiation sensor 33 is mounted on the upper end of the substrate 3 at a position on a left side of the solar radiation sensor 32. The solar radiation sensor 34 is mounted on the upper end portion of the substrate 3 at a position on a right side of the solar radiation sensor 35.

The solar radiation sensor 38 is mounted on a lower right end of the substrate 3. The solar radiation sensor 41 is mounted on a lower left end of the substrate 3. The solar radiation sensor 39 is mounted on the lower end of the substrate 3 at a position on a left side of the solar radiation sensor 38. The solar radiation sensor 40 is mounted on the lower end of the substrate 3 at a position on a right side of the solar radiation sensor 40.

The positions of the illuminance sensor 31, the rain sensors 36 and 37, and the solar radiation sensors 32 to 35 and 38 to 41 shown in FIG. 4 indicate locations of regions where the light receivers of the respective sensors are provided.

In the illuminance sensor 31, a visible light transmitting filter is provided as an optical filter that transmits only visible light in the region where the light receiving element is provided. This allows the illuminance sensor 31 to more efficiently receive the visible light. Further, such a visible light transmitting filter may not be provided.

In each of the rain sensors 36 and 37, a visible light cutting filter serving as an optical filter that does not transmit the visible light is provided in the region where the light receiving element is provided. This allows the rain sensors 36 and 37 to more efficiently receive the infrared light emitted by the light emitters 11a and 11b. Further, such a visible light cutting filter may not be provided.

In each of the solar radiation sensors 32 to 35 and 38 to 41, no optical filter is provided in the region where the light receiving element is provided. Also, each of the solar radiation sensors 32 to 35 and 38 to 41 may be provided with a visible light cutting filter.

[Example of Detection Characteristics of Various Sensors]

Figure 5:
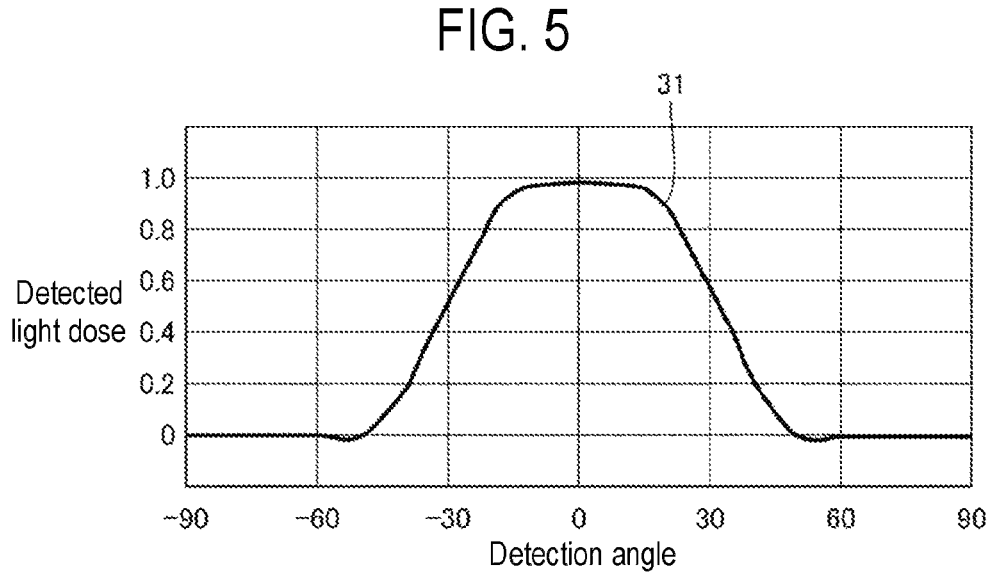
FIG. 5 is a diagram showing a relationship between a detection angle and a detected light dose of an illuminance sensor according to the first embodiment.

FIG. 5 is a diagram showing a relationship between a detection angle and a detected light dose of the illuminance sensor 31 of the first embodiment. In FIG. 5, the detection angle is indicated such that, for the illuminance sensor 31, an angle on a left side of the substrate 3 shown in FIG. 4 is indicated as a negative angle, and an angle on a right side of the substrate 3 shown in FIG. 4 is indicated as a positive angle. In FIG. 5, the detected light dose indicates a ratio of a light dose when a detected light dose of the illuminance sensor 31 receiving light from the front side of the substrate surface of the substrate 3 shown in FIG. 4 is assumed to be 1.0.

Referring to FIG. 5, the illuminance sensor 31 is able to receive light in a range of, for example, from 50 degrees to 0 degrees in the left-right direction. In the illuminance sensor 31, a maximum peak value of the detected light dose is obtained at a detection angle of, for example, 0 degrees. In this way, the illuminance sensor 31 detects light incident from a wide range in the left-right direction of the substrate 3. The illuminance sensor 31 is capable of detecting illuminance according to the detected light dose.

Information on the illuminance that is detectable by the illuminance sensor 31 is used, for example, to execute auto light control that automatically turns on or off lights provided in the vehicle 100 according to brightness around the vehicle 100.

Figure 6:
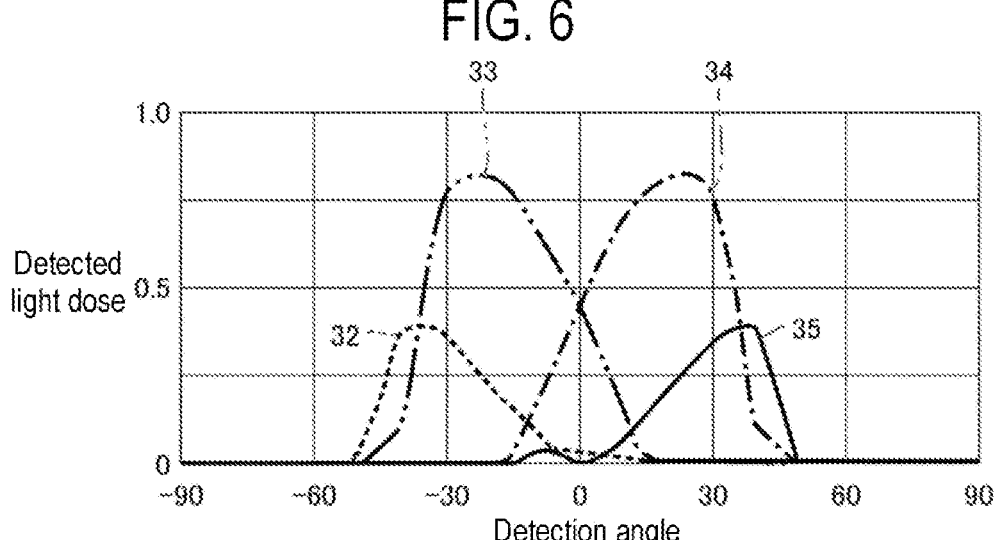
FIG. 6 is a diagram showing a relationship between a detection angle and a detected light dose of a solar radiation sensor according to the first embodiment.

FIG. 6 is a diagram showing a relationship between a detection angle and a detected light dose of the solar radiation sensors 32 to 35 and 38 to 41 of the first embodiment. In FIG. 6, the detection angle is indicated such that, for each solar radiation sensor, an angle on the left side of the substrate 3 shown in FIG. 4 is indicated as a negative angle, and an angle on the right side of the substrate 3 shown in FIG. 4 is indicated as a positive angle. In FIG. 6, the detected light dose indicates a ratio of a light dose when a detected light dose of the solar radiation sensors 32 to 35 and 38 to 41 receiving light from the front side of the substrate surface of the substrate 3 shown in FIG. 4 is assumed to be 1.0.

FIG. 6 shows an example of detection by the solar radiation sensors 32 to 35 by way of example. In FIG. 6, detection characteristics of the solar radiation sensor 32 are indicated by a broken line. In FIG. 6, detection characteristics of the solar radiation sensor 33 are indicated by a two-dot chain line. In FIG. 6, detection characteristics of the solar radiation sensor 34 are indicated by a one-dot chain line. In FIG. 6, detection characteristics of the solar radiation sensor 35 are indicated by a solid line.

As shown in FIG. 6, a detection angle range of the solar radiation sensors 32 and 33 is, for example, from −50 degrees to 15 degrees. In the solar radiation sensor 32, a maximum peak value of the detected light dose is obtained at a detection angle of, for example, −40 degrees. In the solar radiation sensor 33, a maximum peak value of the detected light dose is obtained at a detection angle of, for example, −20 degrees. In this way, the solar radiation sensors 32 and 33 mainly detect light incident from the left side of the substrate 3.

As shown in FIG. 6, a detection angle range of the solar radiation sensors 34 and 35 is, for example, from −15 degrees to 50 degrees. In the solar radiation sensor 35, a maximum peak value of the detected light dose is obtained at a detection angle of, for example, 40 degrees. In the solar radiation sensor 34, a maximum peak value of the detected light dose is obtained at a detection angle of, for example, 20 degrees. In this way, the solar radiation sensors 34 and 35 mainly detect light incident from the right side of the substrate 3.

Detection characteristics of the solar radiation sensors 38 to 41 are similar to the detection characteristics of the solar radiation sensors 32 to 35 shown in FIG. 6.

In the solar radiation sensors 32 to 35 and 38 to 41, each solar radiation sensor is able to detect a light dose. By analyzing the light dose detected by each of the plurality of solar radiation sensors, it is possible to specify an incident direction of the light.

Information on the light dose and information on the incident direction of the light detected by the solar radiation sensors 32 to 35 and 38 to 41 are used, for example, to automatically control an air conditioner installed in the vehicle 100.

Figure 7:
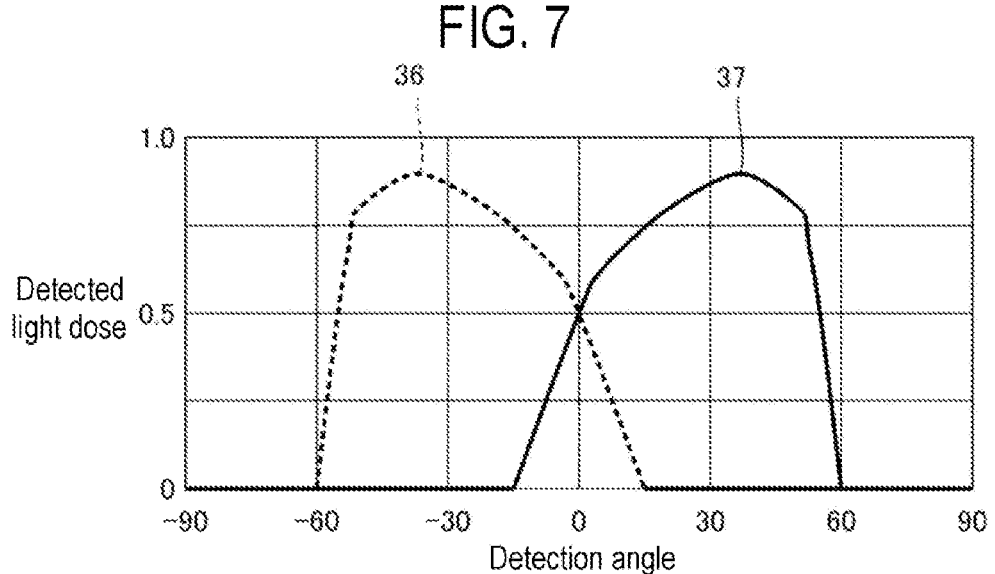
FIG. 7 is a diagram showing a relationship between a detection angle and a detected light dose of a rain sensor according to the first embodiment.

FIG. 7 is a diagram showing a relationship between a detection angle and a detected light dose of the rain sensors 36 and 37 of the first embodiment. In FIG. 7, the detection angle is indicated such that, for each rain sensor, an angle on the left side of the substrate 3 shown in FIG. 4 is indicated as a negative angle, and an angle on the right side of the substrate 3 shown in FIG. 4 is indicated as a positive angle. In FIG. 7, a detected light dose indicates a ratio of a light dose when a detected light dose of the rain sensors 36 and 37 receiving light from the front side of the substrate surface of the substrate 3 shown in FIG. 4 is assumed to be 1.0.

In FIG. 7, detection characteristics of the rain sensor 36 are indicated by a broken line. In FIG. 7, detection characteristics of the rain sensor 37 are indicated by a solid line.

As shown in FIG. 7, the rain sensor 36 has a detection angle range of, for example, −60 degrees to 15 degrees. In the rain sensor 36, a maximum peak value of the detected light dose is obtained at a detection angle of, for example, −40 degrees. In this way, the rain sensor 36 mainly detects the light incident from the left side of the substrate 3.

The rain sensor 37 has a detection angle range of, for example, 60 degrees to −15 degrees. In the rain sensor 37, a maximum peak value of the detected light dose is obtained at a detection angle of, for example, 40 degrees. In this way, the rain sensor 37 mainly detects the light incident from the right side of the substrate 3.

The rain sensors 36 and 37 are capable of detecting the rain condition according to the detected light dose. Information on the rain condition detected by the rain sensors 36 and 37 is used, for example, to execute control to automatically operate a wiper device provided in the vehicle 100 during rain.

In the first embodiment, an example has been described in which the rain sensors 36 and 37, the illuminance sensor 31, and the solar radiation sensors 32 to 35 and 38 to 41 are provided on one substrate 3 in the light detection device 1. However, the present disclosure is not limited thereto and as in the fifth embodiment, the rain sensors 36 and 37 may not be provided, and the illuminance sensor 31 and the solar radiation sensors 32 to 35 and 38 to 41 may be provided on one substrate 3. In addition, the solar radiation sensors 32 to 35 and 38 to 41 may not be provided, and the rain sensors 36 and 37 and the illuminance sensor 31 may be provided on one substrate 3. Furthermore, the illuminance sensor 31 may not be provided, and the rain sensors 36 and 37 and the solar radiation sensors 32 to 35 and 38 to 41 may be provided on one substrate 3.

According to the first embodiment, as shown in FIG. 4, by providing the rain sensors 36 and 37, the illuminance sensor 31, and the solar radiation sensors 32 to 35 and 38 to 41 on one substrate 3 in the light detection device 1, the light detection device 1 may be downsized. Such an effect may also be obtained when the rain sensors 36 and 37 and the illuminance sensor 31 are provided on one substrate 3, and when the rain sensors 36 and 37 and the solar radiation sensors 32 to 35 and 38 to 41 are provided on one substrate 3.

According to the first embodiment, as shown in FIG. 4, providing the rain sensors 36 and 37, the illuminance sensor 31, and the solar radiation sensors 32 to 35 and 38 to 41 on one substrate 3 in the light detection device 1 enables optical design of a plurality of types of optical sensors to be performed for a region on the same substrate, thereby facilitating optical design of the light detection device 1. Such an effect may also be obtained when the rain sensors 36 and 37 and the illuminance sensor 31 are provided on one substrate 3, and when the rain sensors 36 and 37 and the solar radiation sensors 32 to 35 and 38 to 41 are provided on one substrate 3.

According to the first embodiment, as shown in FIG. 4, providing the rain sensors 36 and 37, the illuminance sensor 31, and the solar radiation sensors 32 to 35 and 38 to 41 on one substrate 3 in the light detection device 1 reduces the number of substrates required for mounting a plurality of types of optical sensors compared to when a substrate for mounting the optical sensors are provided for each type of optical sensors. Thus, in the first embodiment, it is possible to reduce manufacturing costs of the light detection device 1.

According to the first embodiment, as shown in FIGS. 2 and 3, in the light detection device 1, the light transmitting body 4 covers the substrate 3, the rain sensors 36 and 37, the illuminance sensor 31, and the solar radiation sensors 32 to 35 and 38 to 41, and the light shielding body 5 covers the periphery of the light transmitting body 4 in regions other than the opening 50 so as to shield the light. Thus, in the first embodiment, the light detection device 1 may reduce an amount of unnecessary light detected such as light reflected from parts other than the windshield 101 of the vehicle 100, for example.

According to the first embodiment, as shown in FIG. 2, in the light detection device 1, the light transmitting body 4 and the light shielding body 5 include a structure formed by double molding. This may facilitate manufacturing of the light detection device 1.

According to the first embodiment, as shown in FIG. 2, in the light detection device 1, the light transmitting body 4 includes the lens portion 49 which is the lens-shaped structure protruding into the opening 50 in the light shielding body 5. Therefore, the lens portion 49 may collect the light coming from outside the opening 50 more efficiently.

According to the first embodiment, as shown in FIG. 2, since the thickness of the opening 50 in the light shielding body 5 is thicker than the thickness of the lens portion 49 in the light detection device 1, the lens portion 49 is suppressed from collecting unnecessary light such as the light reflected from parts other than the windshield 101 of the vehicle 100, for example.

According to the first embodiment, as shown in FIGS. 2 and 4, in the light detection device 1, the light transmitting body 4, which is arranged at a position to make it possible to receive infrared light reflected by the windshield 101 due to raindrops adhering to the windshield 101 of the vehicle, includes the lens portion 49 which is the lens-shaped structure protruding into the opening 50 of the light shielding body 5. Therefore, the rain sensors 36 and 37 may collect the light coming from outside the opening 50 more efficiently by using the lens portion 49.

According to the first embodiment, as shown in FIGS. 4 to 7, arranging the plurality of sensors, such as the rain sensors 36 and 37, the illuminance sensor 31, and the solar radiation sensors 32 to 35 and 38 to 41, on the substrate 3 in a way that they are able to receive the light incident on the light transmitting body 4 from the necessary directions depending on the detection functions may prevent disruption to the detection functions of each sensor even if the plurality of sensors are mounted on one substrate 3.

According to the first embodiment, as shown in FIGS. 2, 4 and 7, arranging the rain sensors 36 and 37 at positions where it is possible to receive the infrared light reflected by the windshield 101 when there is no rain adhering to the window (windshield 101) of the vehicle 100 may prevent disruption to the detection functions of the rain sensors 36 and 37 even when the plurality of sensors are mounted on one substrate 3.

According to the first embodiment, as shown in FIGS. 4 and 5, arranging the illuminance sensor 31 at a position where it is possible to receive the light incident on the light transmitting body 4 from a wider range than the rain sensors 36 and 37 and the solar radiation sensors 32 to 35 and 38 to 41 may prevent disruption to the detection functions of the illuminance sensor 31 even when the plurality of sensors are mounted on one substrate 3.

According to the first embodiment, as shown in FIGS. 4 and 6, the solar radiation sensors 32 to 35 and 38 to 41 include the plurality of light receivers (the plurality of light receivers constituting the solar radiation sensors 32 to 35 and 38 to 41) arranged to detect the illuminance and an incident angle of the light incident on the light transmitting body. Therefore, even when the plurality of sensors are mounted on one substrate 3, disruption to the function of the solar radiation sensors 32 to 35 and 38 to 41 may be prevented.

According to the first embodiment, as shown in FIGS. 2 and 3, the light detection system 10 includes the light detection device 1, the light emitters 11*a* and 11*b*, and the lenses 12*a* to 12*d*. Therefore, the features of the light detection device 1 described above make it possible to downsize the light detection system 10, facilitate the optical design thereof, and reduce the manufacturing costs thereof.

Second Embodiment

In a second embodiment, another example of an arrangement of various sensors on the substrate 3 of the light detection device 1 will be described. In the arrangement of various sensors on the substrate 3 shown in FIG. 4 in the first embodiment, the rain sensors 36 and 37 and the solar radiation sensors 32 to 35 and 38 to 41 have high detection accuracy mainly for the light incident from the left and right sides of the substrate 3. In the second embodiment, in association with the rain sensors 36 and 37 and the solar radiation sensors 32 to 35 and 38 to 41, examples of arrangement of various sensors having high detection accuracy even for the light incident from the upper and lower sides of the substrate 3 in addition to the left and right sides of the substrate 3 will be described.

Figure 8:
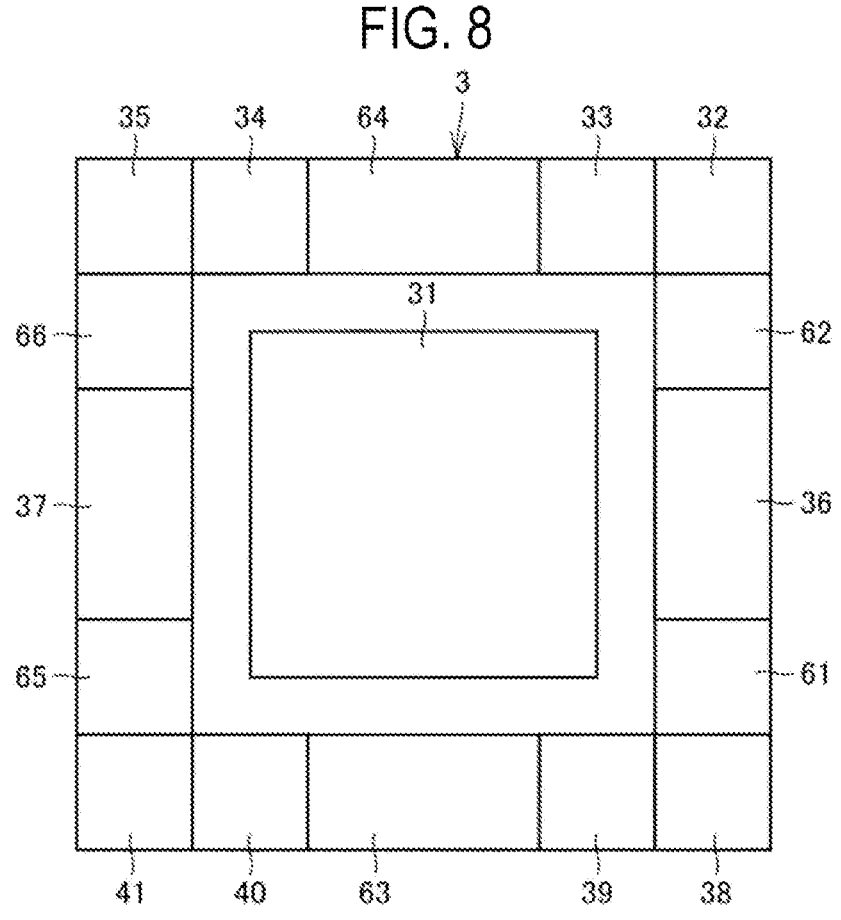
FIG. 8 is a plan view of a substrate showing an example of arrangement of various sensors on the substrate of a light detection device according to a second embodiment.

FIG. 8 is a plan view of the substrate 3 showing an example of arrangement of various sensors on the substrate 3 of the light detection device 1 according to the second embodiment.

In FIG. 8, the substrate 3 is shown to correspond to the up-down direction (vertical direction) and the left-right direction (horizontal direction) when the light detection device 1 attached to the windshield 101 is viewed from the front side. In the following description, the directions will be described in terms of the up-down direction and the left-right direction in a state in which the light detection device 1 is attached to the windshield 101 as in FIG. 4.

The configuration in FIG. 8 differs from the configuration in FIG. 4 in terms of the following points. A solar radiation sensor 61 is mounted at a position between the solar radiation sensor 38 and the rain sensor 36. A solar radiation sensor 62 is mounted at a position between the solar radiation sensor 32 and the rain sensor 36. A solar radiation sensor 65 is mounted at a position between the solar radiation sensor 41 and the rain sensor 37. A solar radiation sensor 66 is mounted at a position between the solar radiation sensor 35 and the rain sensor 37. A rain sensor 63 is mounted at a position between the solar radiation sensor 39 and the solar radiation sensor 40. A rain sensor 64 is mounted at a position between the solar radiation sensor 33 and the solar radiation sensor 34.

When the solar radiation sensors 61, 62, 65 and 66 are mounted as described above, the solar radiation sensors 38, 61, 62 and 32 may obtain detection characteristics similar to the detection characteristics shown in FIG. 6, in response to the light incident from the upper and lower sides of the substrate 3. Moreover, the solar radiation sensors 41, 65, 66, and 35 may obtain detection characteristics similar to the detection characteristics shown in FIG. 6, in response to the light incident from the upper and lower sides of the substrate 3.

In addition, when the rain sensors 63 and 64 are mounted as described above, the rain sensors 63 and 64 may obtain detection characteristics similar to the detection characteristics shown in FIG. 7, in response to the light incident from the upper and lower sides of the substrate 3. In the configuration of FIG. 8, in order for the rain sensors 63 and 64 to obtain the detection characteristics similar to those shown in FIG. 7, the light detection system 10 may include a light emitter and a lens arranged to allow the infrared light to be incident on the lens portion 49 from an upper side of the light detection device 1, and a light emitter and a lens arranged to allow the infrared light to be incident on the lens portion 49 from a lower side of the light detection device 1.

Third Embodiment

In a third embodiment, a light detection system in which a relative positional relationship between a position of a light detection device and positions of a plurality of light emitters is different from above will be described. Specifically, in the third embodiment, an example will be described in which the plurality of light emitters and lenses are provided at positions below the position of the light detection device.

[Configuration of Light Detection System 10A]

Figure 9:
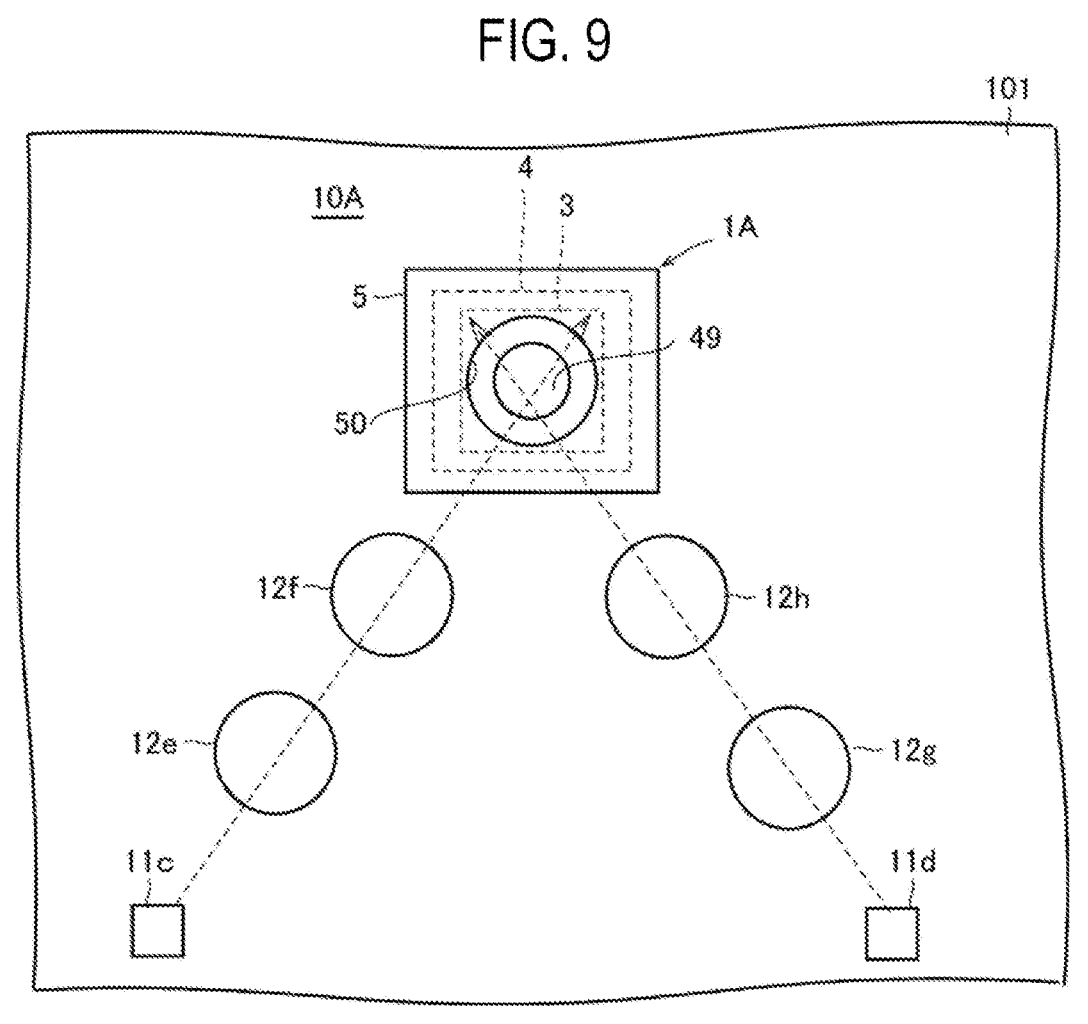

FIG. 9 is a diagram showing a configuration of a light detection system 10A according to the third embodiment. In FIG. 9, in order to clarify a relative positional relationship between a light detection device 1A and a plurality of light emitters 11c and 11d and a plurality of lenses 12e, 12f, 12g and 12h, the light detection system 10A attached to a windshield 101 is shown as viewed from outside the windshield 101.

As shown in FIG. 9, in the light detection system 10A, the plurality of light emitters 11c and 11d that generate the infrared light used for detecting the rain condition with the rain sensor are provided downward from the light detection device 1A. The light detection device 1A has the same structure as the light detection device 1 shown in FIGS. 2 and 3, except for arrangements of various sensors on the substrate 3.

The lenses 12e, 12f, 12g and 12h have the same configurations and functions as the lenses 12a, 12b, 12c and 12d shown in FIGS. 2 and 3.

The infrared light emitted by the light emitter 11c passes through the lens 12e and is reflected by the windshield 101, as indicated by a broken line arrow in FIG. 9. The infrared light reflected by the windshield 101 passes through the lens 12f, and enters into the light detection device 1A so that the infrared light reaches the upper right end of the substrate 3 through the opening 50 of the light shielding body 5 and the lens portion 49, as indicated by the broken line arrow in FIG. 9.

The infrared light emitted by the light emitter 11d passes through the lens 12g and is reflected by the windshield 101, as indicated by a broken line arrow in FIG. 9. The infrared light reflected by the windshield 101 passes through the lens 12h, and enters into the light detection device 1A so that the infrared light reaches the upper left end of the substrate 3 through the opening 50 of the light shielding body 5 and the lens portion 49, as indicated by the broken line arrow in FIG. 9.

[Arrangement of Various Sensors on the Substrate 3 of the Light Detection Device 1A]

Figure 10:
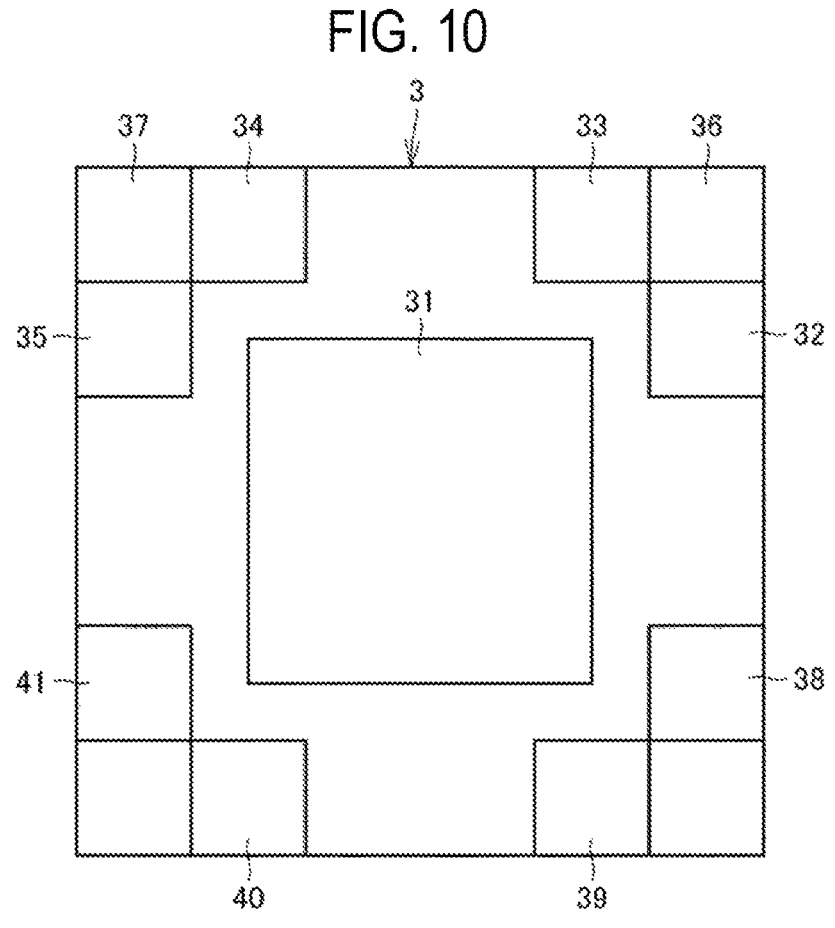
FIG. 10 is a plan view of a substrate showing an example of arrangement of various sensors on the substrate of a light detection device according to the third embodiment.

FIG. 10 is a plan view of the substrate 3 showing an example of arrangement of various sensors on the substrate 3 of the light detection device 1A according to the third embodiment. In FIG. 10, the substrate 3 is shown to correspond to the up-down direction (vertical direction) and the left-right direction (horizontal direction) when the light detection device 1A attached to the windshield 101 is viewed from the front side. In the following description, the directions will be described in terms of the up-down direction and the left-right direction in a state in which the light detection device 1 is attached to the windshield 101 as in FIG. 4.

FIG. 10 differs from FIG. 4 in terms of the positions where the rain sensors 36 and 37 and the solar radiation sensors 32, 35, 38 and 41 are attached.

The rain sensor 36 is attached to the upper right end of the substrate 3. The rain sensor 37 is mounted on the upper left end of the substrate 3. The solar radiation sensor 32 is mounted at a position adjacent to the rain sensor 36 at a downward direction. The solar radiation sensor 35 is mounted at a position adjacent to the rain sensor 37 at the downward direction. The solar radiation sensor 38 is mounted at a position adjacent to the position of the lower right end of the substrate 3 at an upward direction. The solar radiation sensor 41 is mounted at a position adjacent to the position of the lower left end of the substrate 3 at the upward direction.

The rain sensor 36 may mainly detect light emitted from the light emitter 11c. The rain sensor 37 may mainly detect light emitted from the light emitter 11d. Specifically, the rain sensors 36 and 37 are arranged at positions where they are able to receive the infrared light reflected by the windshield 101 when there is no rain or raindrops adhering to the windshield 101.

[Example of Detection Characteristics of Various Sensors]

Figure 11:
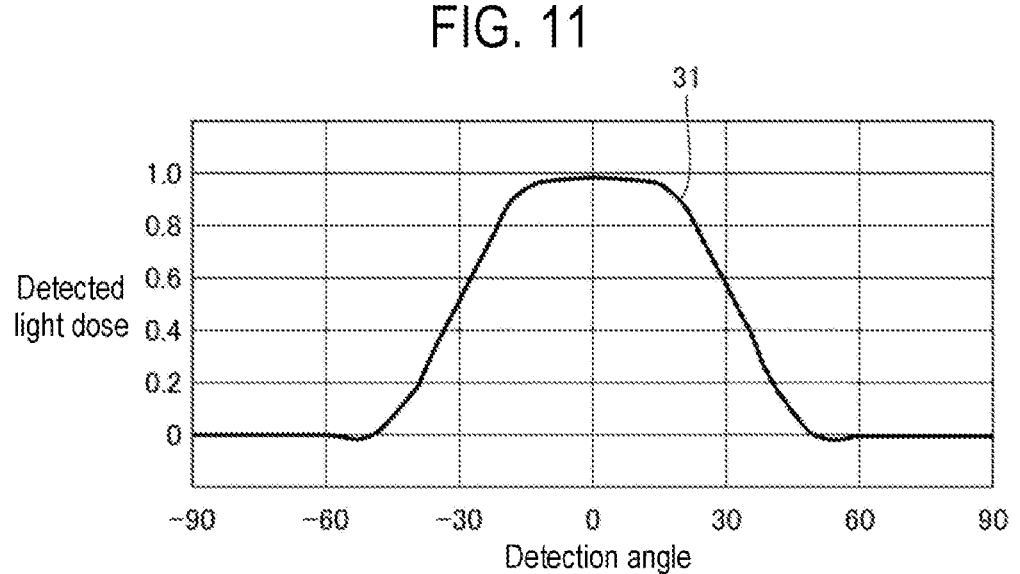
FIG. 11 is a diagram showing a relationship between a detection angle and a detected light dose of an illuminance sensor according to the third embodiment.

FIG. 11 is a diagram showing a relationship between a detection angle (degrees) and a detected light dose (lumens) of the illuminance sensor 31 of the third embodiment. In FIG. 11, the detection angle (degrees) is indicated such that, for the illuminance sensor, an angle on the left side of the substrate 3 shown in FIG. 10 is indicated as a negative angle, and an angle on the right side of the substrate 3 shown in FIG. 10 is indicated as a positive angle.

As shown in FIG. 11, the illuminance sensor 31 of the third embodiment is attached at the same position as the illuminance sensor 31 of FIG. 4, and therefore has the same detection characteristics as those shown in FIG. 5.

Figure 12:
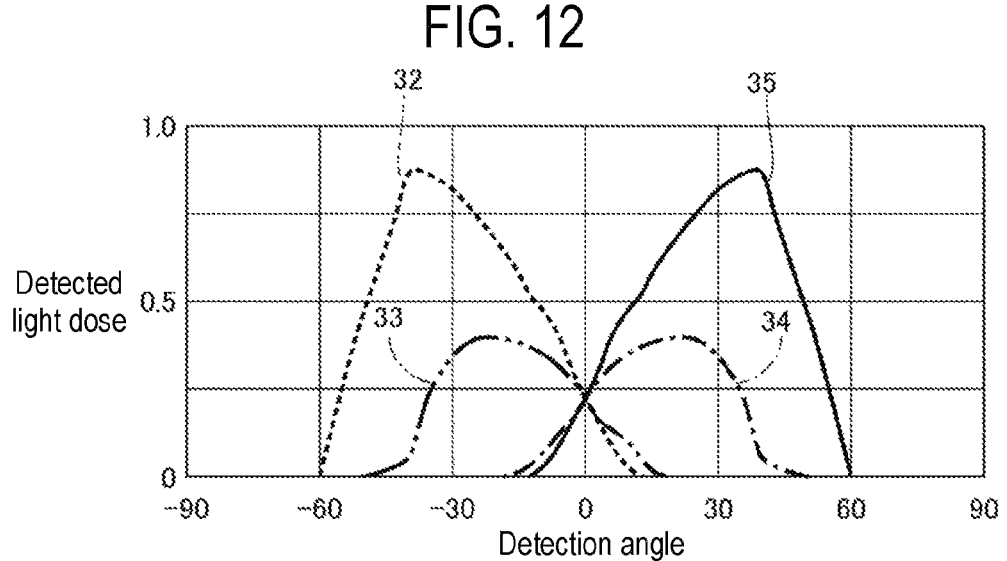
FIG. 12 is a diagram showing a relationship between a detection angle and a detected light dose of a solar radiation sensor according to the third embodiment.

FIG. 12 is a diagram showing a relationship between a detection angle and a detected light dose of the solar radiation sensors 32 to 35 and 38 to 41. In FIG. 12, the detection angle is indicated such that, for each solar radiation sensor, an angle on the left side of the substrate 3 shown in FIG. 10 is indicated as a negative angle, and an angle on the right side of the substrate 3 shown in FIG. 10 is indicated as a positive angle. In FIG. 12, the detected light dose indicates a ratio of a light dose when a detected light dose of the solar radiation sensors 32 to 35 and 38 to 41 receiving light from the front side of the substrate surface of the substrate 3 shown in FIG. 10 is assumed to be 1.0.

FIG. 12 shows an example of detection by the solar radiation sensors 32 to 35 by way of example. In FIG. 12, detection characteristics of the solar radiation sensor 32 are indicated by a broken line. In FIG. 12, detection characteristics of the solar radiation sensor 33 are indicated by a two-dot chain line. In FIG. 12, detection characteristics of the solar radiation sensor 34 are indicated by a one-dot chain line. In FIG. 12, detection characteristics of the solar radiation sensor 35 are indicated by a solid line.

As shown in FIG. 12, a detection angle range of the solar radiation sensor 32 is, for example, from –60 degrees to 10 degrees. In the solar radiation sensor 32, a maximum peak value of the detected light dose is obtained at a detection angle of, for example, –40 degrees. A detection angle range of the solar radiation sensor 33 is, for example, –50 degrees to 15 degrees. In the solar radiation sensor 33, a maximum peak value of the detected light dose is obtained at a detection angle of, for example, –20 degrees. In this way, the solar radiation sensors 32 and 33 mainly detect the light incident from the left side of the substrate 3.

As shown in FIG. 12, a detection angle range of the solar radiation sensor 34 is, for example, –15 degrees to 50 degrees. In the solar radiation sensor 34, a maximum peak value of the detected light dose is obtained at a detection angle of, for example, 20 degrees. A detection angle range of the solar radiation sensor 35 is, for example, from –10 degrees to 60 degrees. In the solar radiation sensor 35, a maximum peak value of the detected light dose is obtained at a detection angle of, for example, 40 degrees. In this way, the solar radiation sensors 34 and 35 mainly detect the light incident from the right side of the substrate 3.

Detection characteristics of the solar radiation sensors 38 to 41 are similar to the detection characteristics of the solar radiation sensors 32 to 35 shown in FIG. 12.

In the solar radiation sensors 32 to 35 and 38 to 41, each solar radiation sensor is able to detect a light dose. By analyzing the light dose detected by each of the plurality of solar radiation sensors, it is possible to specify an incident direction of the light.

Figure 13:
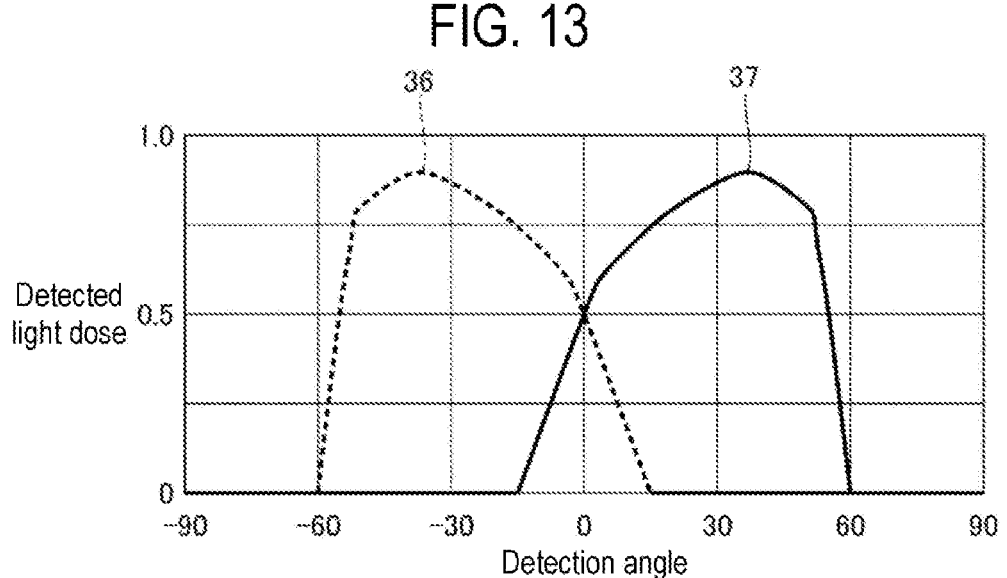
FIG. 13 is a diagram showing a relationship between a detection angle and a detected light dose of a rain sensor according to the third embodiment.

FIG. 13 is a diagram showing a relationship between a detection angle and a detected light dose of the rain sensors 36 and 37 of the third embodiment. In FIG. 13, the detection angle is indicated such that, for each rain sensor, an angle on the left side of the substrate 3 shown in FIG. 10 is indicated as a negative angle, and an angle on the right side of the substrate 3 shown in FIG. 10 is indicated as a positive angle. In FIG. 13, a detected light dose indicates a ratio of a light dose when a detected light dose of the rain sensors 36 and 37 receiving infrared light from the front side of the substrate surface of the substrate 3 shown in FIG. 10 is assumed to be 1.0.

In FIG. 13, detection characteristics of the rain sensor 36 are indicated by a broken line. In FIG. 13, detection characteristics of the rain sensor 37 are indicated by a solid line.

As shown in FIG. 13, the rain sensor 36 has a detection angle range of, for example, –60 degrees to 15 degrees. In the rain sensor 36, a maximum peak value of the detected light dose is obtained at a detection angle of, for example, –40 degrees. In this way, the rain sensor 36 mainly detects the light incident from the left side of the substrate 3.

The rain sensor 37 has a detection angle range of, for example, 60 degrees to –15 degrees. In the rain sensor 37, a maximum peak value of the detected light dose is obtained at a detection angle of, for example, 40 degrees. In this way, the rain sensor 37 mainly detects the light incident from the right side of the substrate 3.

As shown in FIG. 13, the rain sensors 36 and 37 have detection characteristics similar to those of the rain sensors 36 and 37 shown in FIG. 7.

In the third embodiment, an example has been described in which the rain sensors 36 and 37, the illuminance sensor 31, and the solar radiation sensors 32 to 35 and 38 to 41 are provided on one substrate 3 in the light detection device 1A. However, the present disclosure is not limited thereto, and the rain sensors 36 and 37 may not be provided, but the illuminance sensor 31 and the solar radiation sensors 32 to 35 and 38 to 41 may be provided on one substrate 3. In addition, the solar radiation sensors 32 to 35 and 38 to 41 may not be provided, but the rain sensors 36 and 37 and the illuminance sensor 31 may be provided on one substrate 3. In addition, the illuminance sensor 31 may not be provided, but the rain sensors 36 and 37 and the solar radiation sensors 32 to 35 and 38 to 41 may be provided on one substrate 3.

According to the third embodiment, the same effects as those described in the first embodiment may be obtained. According to the third embodiment, in addition to the effects described in the first embodiment, the following effects may be obtained.

The rain sensors 36 and 37 may detect raindrops by mainly receiving infrared light emitted by the light emitters 11c and 11d instead of natural light. On the other hand, the illuminance sensor 31 may detect illuminance by mainly receiving natural light, and the solar radiation sensors 32 to 35 and 38 to 41 may detect the incident direction of light and the like by mainly receiving natural light.

The illuminance sensor 31 and the solar radiation sensors 32 to 35 and 38 to 41 may obtain desired light detection results when they mainly receive natural light. However, when the rain sensors 36 and 37, the illuminance sensor 31, and solar radiation sensors 32 to 35 and 38 to 41 are provided on one substrate 3, it is necessary to prevent influence of the infrared light used for the rain sensors 36 and 37. In cases where the influence of the infrared light used for the rain sensors 36 and 37 occur, for example, if the infrared light reflected by the lenses 12e to 12h transmitting the infrared light is received by the illuminance sensor 31 and the solar radiation sensors 32 to 35 and 38 to 41, there may be a possibility that detected values from the illuminance sensor 31 and detected values from the solar radiation sensors 32 to 35 and 38 to 41 are adversely affected.

In the third embodiment, it is an object to provide the light detection system 10A which assures that the infrared light used for such rain sensors 36 and 37 does not adversely affect the detected values from the illuminance sensor 31 and the detected values from the solar radiation sensors 32 to 35 and 38 to 41.

The natural light mainly received by the illuminance sensor 31 and the solar radiation sensors 32 to 35 and 38 to 41 is based on sunlight and thus, an amount of light incident on the light detection device 1A from above the light detection device 1A is basically substantial. Accordingly, in the illuminance sensor 31 and the solar radiation sensors 32 to 35 and 38 to 41, if the infrared light reflected by the lenses 12e to 12h and the like is made difficult to be incident on the light detection device 1A from above the light detection device 1A, it is possible to prevent the infrared light used by the rain sensors 36 and 37 from adversely affecting the detected values from the illuminance sensor 31 and the detected values from the solar radiation sensors 32 to 35 and 38 to 41.

In the third embodiment, the light emitters 11c and 11d and the lenses 12e to 12h for causing the infrared light used by the rain sensors 36 and 37 to be incident on the light detection device 1A are provided downward from the light detection device 1A. As a result, in the third embodiment, the infrared light reflected by the lenses 12e to 12h and the like is prevented from being incident on the light detection device 1A from above the light detection device 1A. Therefore, it is possible to prevent the infrared light used in the rain sensors 36 and 37 from adversely affecting the detected values from the illuminance sensor 31 and the detected values from the solar radiation sensors 32 to 35 and 38 to 41.

Further, in the third embodiment, the light emitters 11c and 11d and the lenses 12e to 12h for causing the infrared light used by the rain sensors 36 and 37 to be incident on the light detection device 1A are provided downward from the light detection device 1A so as to suppress mutual interference between the infrared light received by the rain sensors 36 and 37 and the light received by other optical sensors. Accordingly, no matter what an angle of the windshield 101 is, the rain sensors 36 and 37 may accurately detect rain.

Fourth Embodiment

In a fourth embodiment, another example of an arrangement of various sensors on the substrate 3 of the light detection device 1A will be described. In the arrangement of the various sensors on the substrate 3 shown in FIG. 10 according to the third embodiment, the solar radiation sensors have high detection accuracy mainly for the light incident on the substrate 3 from the left and right sides of the substrate 3. In the fourth embodiment, in association with the solar radiation sensors, an example of arrangement of various sensors that may detect light incident from the upper and lower sides of the substrate 3 with high detection accuracy will be described.

Figure 14:
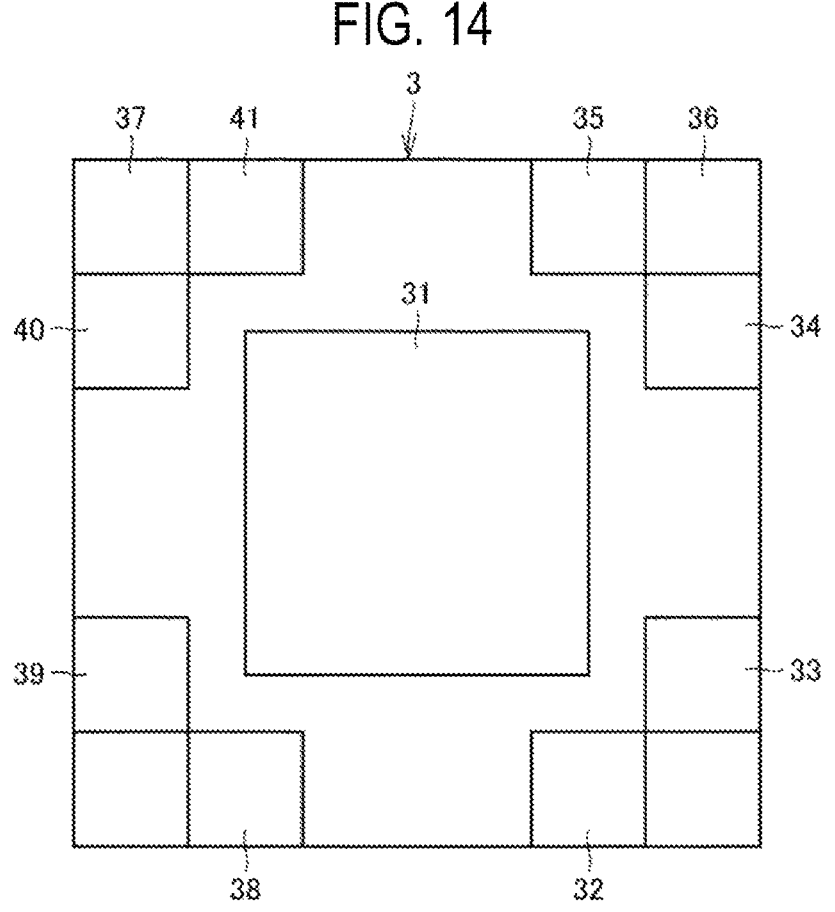
FIG. 14 is a plan view of a substrate showing an example of arrangement of various sensors on the substrate of a light detection device according to a fourth embodiment.

FIG. 14 is a plan view of the substrate 3 showing an example of arrangement of various sensors on the substrate 3 of the light detection device 1A according to the fourth embodiment.

In FIG. 14, the substrate 3 is shown to correspond to the up-down direction (vertical direction) and the left-right direction (horizontal direction) when the light detection device 1 attached to the windshield 101 is viewed from the front side. In the following description, the directions will be described in terms of the up-down direction and the left-right direction in a state in which the light detection device 1 is attached to the windshield 101 as in FIG. 4.

The configuration in FIG. 14 differs from the configuration in FIG. 10 in terms of the following points. The solar radiation sensor 32 is attached at the position of the solar radiation sensor 39 in FIG. 10. The solar radiation sensor 33 is attached at the position of the solar radiation sensor 38 in FIG. 10. The solar radiation sensor 34 is attached at the position of the solar radiation sensor 32 in FIG. 10. The solar radiation sensor 35 is attached at the position of the solar radiation sensor 33 in FIG. 10. The solar radiation sensor 38 is attached at the position of the solar radiation sensor 40 in FIG. 10. The solar radiation sensor 39 is attached at the position of the solar radiation sensor 41 in FIG. 10. The solar radiation sensor 40 is attached at the position of the solar radiation sensor 35 in FIG. 10. The solar radiation sensor 41 is attached at the position of the solar radiation sensor 34 in FIG. 10.

When the solar radiation sensors 32 to 35 and 38 to 41 are mounted as described above, the solar radiation sensors 32 to 35 may obtain detection characteristics similar to those shown in FIG. 12, in response to the light incident from the upper and lower sides of the substrate 3. In addition, the solar radiation sensors 38 to 41 may obtain detection characteristics similar to those shown in FIG. 12, in response to the light incident from the upper and lower sides of the substrate 3.

Fifth Embodiment

In a fifth embodiment, an example will be described in which the illuminance sensor 31 and the solar radiation sensors 32 to 35 and 38 to 41 are provided on one substrate 3 in the light detection device 1.

[Arrangement of Various Sensors on the Substrate 3 of the Light Detection Device 1]

Figure 15:
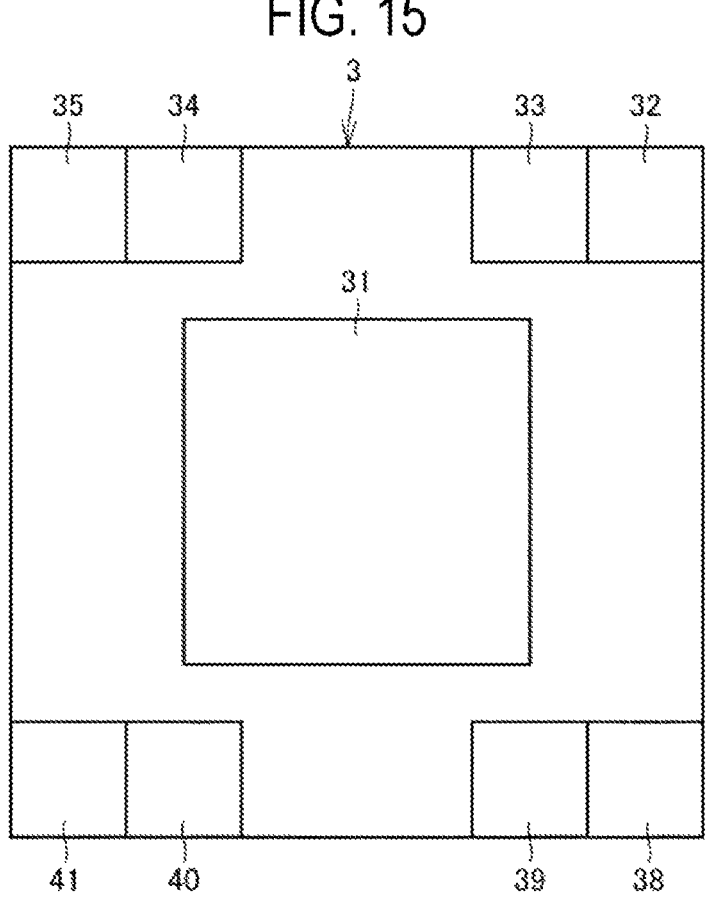
FIG. 15 is a plan view of a substrate showing an example of arrangement of various sensors on the substrate of a light detection device according to a fifth embodiment.

FIG. 15 is a plan view of the substrate 3 showing an example of arrangement of various sensors on the substrate 3 of the light detection device 1 according to the fifth embodiment. In FIG. 15, the substrate 3 is shown to correspond to the up-down direction (vertical direction) and the left-right direction (horizontal direction) when the light detection device 1 attached to the windshield 101 is viewed from the front side. In the following description, the directions will be described in terms of the up-down direction and the left-right direction in a state in which the light detection device 1 is attached to the windshield 101 as in FIG. 4.

The configuration in FIG. 15 differs from the configuration in FIG. 4 in that the rain sensors 36 and 37 are not provided on the substrate 3, and the illuminance sensor 31 and the solar radiation sensors 32 to 35 and 38 to 41 are provided on the substrate 3.

Also in the fifth embodiment, as in the first embodiment, it is possible to downsize the light detection device 1 and the light detection system 10, facilitate the optical design thereof, and reduce the manufacturing costs thereof.

The configuration in which the rain sensors 36 and 37 are not provided and the illuminance sensor 31 and the solar radiation sensors 32 to 35 and 38 to 41 are provided on the substrate 3 may also be applied to the substrate 3 on which the sensors are arranged as shown in FIGS. 8, 10 and 14.

Sixth Embodiment

In a sixth embodiment, an example will be described in which in the light detection device 1, front end sensors 71 and 72 are provided on one substrate 3 in addition to the rain sensors 36 and 37, the illuminance sensor 31, and the solar radiation sensors 32 to 35 and 38 to 41.

In a typical vehicle, there are examples in which a plurality of types of sensors equipped with the light receivers, such as a solar radiation sensor configured to detect an intensity of sunlight and a rain sensor configured to detect an amount of rain, are provided at different positions. A front end sensor may be provided in the vehicle as a light receiving element that detects illuminance. The front end sensor mainly detects, for example, the illuminance of light coming from a certain direction at a front of the vehicle. Detected information thereof is used to determine various lighting control conditions.

The front end sensor is provided separately from the illuminance sensor used for auto light control. As it is necessary for a light detection device and a light detection system to include a plurality of types of sensors, including such a front end sensor, if the plurality of types of sensors are provided at different positions, a problem may arise in that the light detection device including the plurality of types of sensors is difficult to be downsized. In the sixth embodiment, it is an object to downsize the light detection device and the light detection system when the light detection device and the light detection system include a plurality of types of sensors including the front end sensor.

Figure 16:
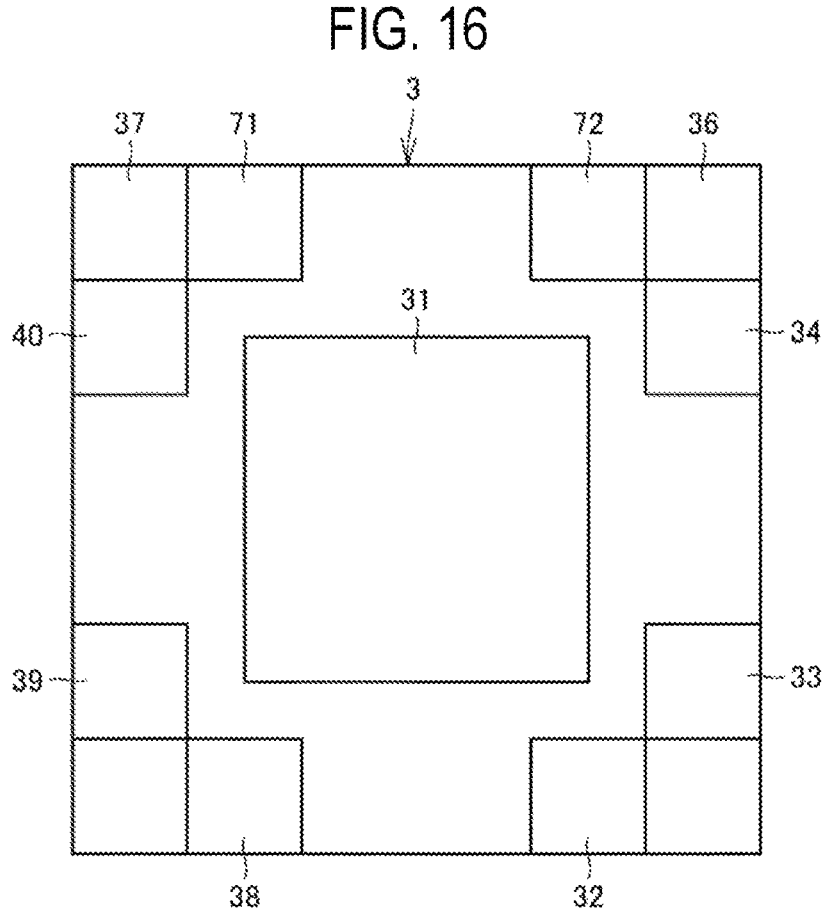
FIG. 16 is a plan view of a substrate showing an example of arrangement of various sensors on the substrate of a light detection device according to a sixth embodiment.

FIG. 16 is a plan view of the substrate 3 showing an example of arrangement of various sensors on the substrate 3 of the light detection device 1 according to the sixth embodiment. In FIG. 16, as in FIG. 14, the substrate 3 is shown to correspond to the up-down direction (vertical direction) and the left-right direction (horizontal direction) when the light detection device 1 attached to the windshield 101 is viewed from the front side. In the following description, the directions will be described in terms of the up-down direction and the left-right direction in a state in which the light detection device 1 is attached to the windshield 101 as in FIG. 4.

The configuration in FIG. 16 differs from the configuration in FIG. 14 in that the front end sensors 71 and 72 are provided on the substrate 3 in addition to the rain sensors 36 and 37, the illuminance sensor 31, and the solar radiation sensors 32 to 34 and 38 to 40.

The front end sensors 71 and 72 are first illuminance sensors that detect illuminance according to light received from a certain direction at the front side of the substrate surface of the substrate 3 among the light incident into the light transmitting body 4. On the other hand, the illuminance sensor 31 is a second illuminance sensor that detects illuminance according to light received from a wider direction than the front end sensors 71 and 72 among the light incident into the light transmitting body 4.

The front end sensors 71 and 72 are sensors that mainly detect, for example, the illuminance of the light received from a certain direction at the front side of the vehicle 100 when the light detection system 10 is attached at the inner side of the windshield 101 of the vehicle 100 as shown in FIG. 1. Illuminance information which is possible to be detected by the front end sensors 71 and 72 is used to determine various lighting control conditions, such as a daytime condition, a nighttime condition, a dusk condition, a tunnel-passing condition, a bridge-passing condition, and the like. A control device executes lighting control for lights provided in the vehicle 100 in response to the lighting control conditions determined according to the illuminance information which is possible to be detected by the front end sensors 71 and 72.

[Example of Detection Characteristics of Various Sensors]

Figure 17:
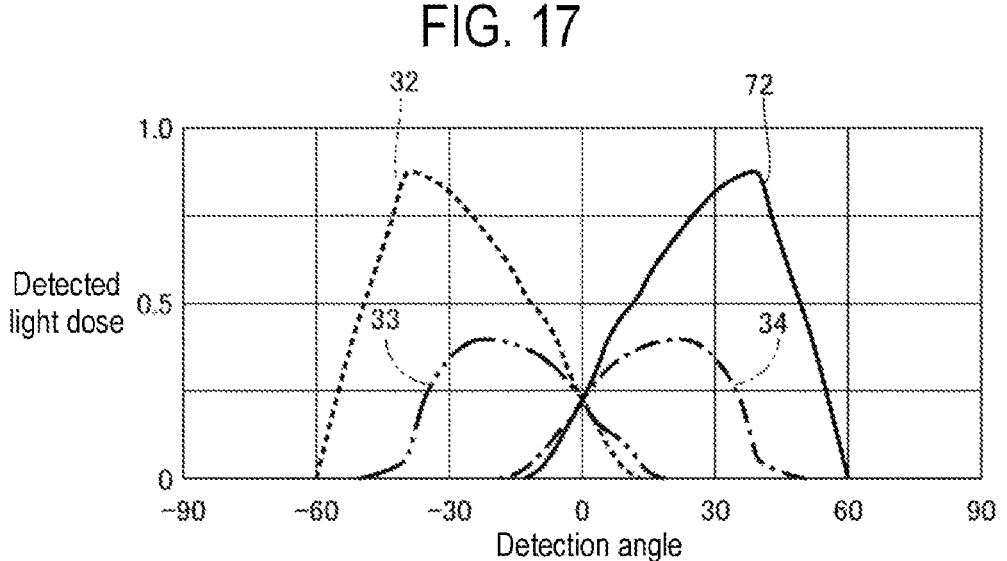
FIG. 17 is a diagram showing a relationship between a detection angle and a detected light dose of a solar radiation sensor and a front-end sensor according to the sixth embodiment.

FIG. 17 is a diagram showing a relationship between a detection angle and a detected light dose of the solar radiation sensors 32 to 34 and 38 to 40 and the front end sensors 71 and 72 of the sixth embodiment. In FIG. 17, the detection angle is indicated such that, for each solar radiation sensor and each front end sensor, an angle on the left side when the substrate 3 shown in FIG. 16 is viewed from a left side in the figure is indicated as a negative angle, and an angle on the right side when the substrate 3 shown in FIG. 16 is viewed from the left side in the figure is indicated as a positive angle. In FIG. 17, the detected light dose indicates a ratio of a light dose when a detected light dose of the solar radiation sensors 32 to 34 and 38 to 40 and the front end sensors 71 and 72 receiving light from the front side of the substrate surface of the substrate 3 is assumed to be 1.0.

FIG. 17 shows an example of detection by the solar radiation sensors 32 to 34 and the front end sensor 72 by way of example. In FIG. 17, detection characteristics of the solar radiation sensor 32 are indicated by a broken line. In FIG. 17, detection characteristics of the solar radiation sensor 33 are indicated by a two-dot chain line. In FIG. 17, detection characteristics of the solar radiation sensor 34 are indicated by a one-dot chain line. In FIG. 17, detection characteristics of the front end sensor 72 are indicated by a solid line.

As shown in FIG. 17, in the front end sensor 72, a maximum peak value of the detected light dose is obtained at a detection angle of, for example, 40 degrees. Although not shown, detection characteristics of the front end sensor 71 are the same as the detection characteristics of the front end sensor 72. As shown in FIG. 17, the front end sensors 71 and 72 mainly detect light incident from the lower side of the substrate 3. Thus, when the light detection system 10 is attached at the inner side of the windshield 101 of the vehicle 100 as shown in FIG. 1, the front end sensors 71 and 72 mainly detect, for example, the illuminance of the light received from a certain direction on the front side of the vehicle 100.

Also in the sixth embodiment, as in the first embodiment, it is possible to downsize the light detection device 1 and the light detection system 10, facilitate the optical design thereof, and reduce the manufacturing costs thereof.

In the sixth embodiment, the example has been described in which the rain sensors 36 and 37, the illuminance sensor 31, the solar radiation sensors 32 to 34 and 38 to 40, and the front end sensors 71 and 72 are provided on one substrate 3 in the light detection device 1. However, the present disclosure is not limited thereto, and as in a seventh embodiment, the rain sensors 36 and 37 and the solar radiation sensors 32 to 34 and 38 to 40 may not be provided, and the illuminance sensor 31 and the front end sensors 71 and 72 may be provided on one substrate 3.

Seventh Embodiment

In a seventh embodiment, an example will be described in which the illuminance sensor 31 and the front end sensors 71 and 72 are provided on one substrate 3 in the light detection device 1.

Figure 18:
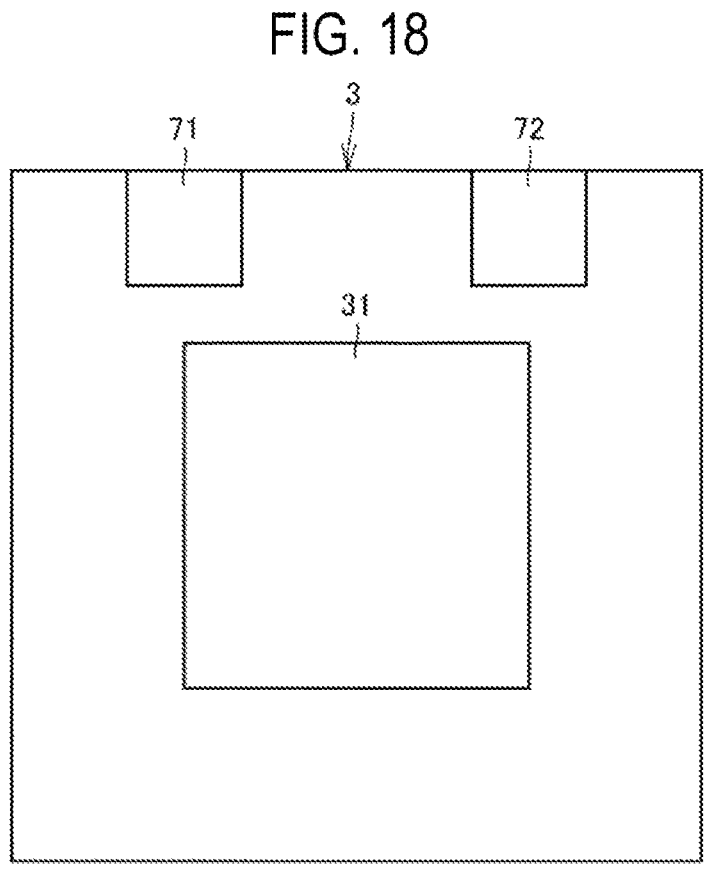
FIG. 18 is a plan view of a substrate showing an example of arrangement of various sensors on the substrate of a light detection device according to a seventh embodiment.

FIG. 18 is a plan view of the substrate 3 showing an example of arrangement of various sensors on the substrate 3 of the light detection device 1 according to the seventh embodiment. In FIG. 18, as in FIG. 16 and the like, the substrate 3 is shown to correspond to the up-down direction (vertical direction) and the left-right direction (horizontal direction) when the light detection device 1 attached to the windshield 101 is viewed from the front side.

The configuration in FIG. 18 differs from the configuration in FIG. 16 in that the solar radiation sensors 32 to 34 and 38 to 40 and the rain sensors 36 and 37 are not provided on the substrate 3, and the illuminance sensor 31 and the front end sensors 71 and 72 are provided on the substrate 3.

In the seventh embodiment as well, as in the first embodiment, it is possible to downsize the light detection device 1 and the light detection system 10, facilitate the optical design thereof, and reduce the manufacturing costs thereof.

In the configuration in which the solar radiation sensors 32 to 34 and 38 to 40 and the rain sensors 36 and 37 are not provided on the substrate 3, and the illuminance sensor 31 and the front end sensors 71 and 72 are provided on the substrate 3, the front end sensors 71 and 72 may be provided in a region on the substrate 3 other than the region shown in FIG. 18.

When the rain sensor is included in the light detection device equipped with a plurality of sensors, in all of the light detection devices and the light detection systems of the first to seventh embodiments described above, it may be possible to adopt an example in which the plurality of light emitters and the lens as the optical element are provided at positions downward from the position of the light detection device according to the configuration shown in FIG. 9.

Supplementary Notes

The embodiments as described above include the following technical idea.

[Configuration 1] A light detection device, including:
a substrate;
a plurality of sensors provided on the substrate;
a light transmitting body made of a light transmitting resin and configured to cover the substrate and the plurality of sensors; and
a light shielding body configured to cover a periphery of the light transmitting body with a shape that shields the periphery of the light transmitting body from light and including an opening at a position facing a substrate surface of the substrate,
wherein the plurality of sensors are provided on the substrate surface at positions where the plurality of sensors are capable of receiving light incident into the light transmitting body from outside the light shielding body through the opening, and
wherein the plurality of sensors include at least two sensors selected from the group of:
a first illuminance sensor configured to detect illuminance according to light received from a certain direction at a front side of the substrate surface among the light incident into the light transmitting body;
a second illuminance sensor configured to detect illuminance according to light received from a wider direction than the first illuminance sensor among the light incident into the light transmitting body;
a solar radiation sensor configured to detect solar radiation according to received light; and
a rain sensor configured to detect rain according to received light.
[Configuration 2] The light detection device of Configuration 1, wherein the plurality of sensors include two sensors among the first illuminance sensor, the second illuminance sensor, the solar radiation sensor, and the rain sensor.
[Configuration 3] The light detection device of Configuration 1, wherein the plurality of sensors include three sensors among the first illuminance sensor, the second illuminance sensor, the solar radiation sensor, and the rain sensor.
[Configuration 4] The light detection device of Configuration 1, wherein the plurality of sensors include four sensors among the first illuminance sensor, the second illuminance sensor, the solar radiation sensor, and the rain sensor.
[Configuration 5] The light detection device of any one of Configurations 1 to 4, wherein the light shielding body is made of a light shielding resin, and
wherein the light transmitting body and the light shielding body include a structure formed by double molding.
[Configuration 6] The light detection device of any one of Configurations 1 to 5, wherein the light transmitting body includes a lens-shaped structure protruding into the opening of the light shielding body.
[Configuration 7] The light detection device of Configuration 5, wherein a thickness of the opening of the light shielding body is thicker than a thickness of the lens-shaped structure.
[Configuration 8] The light detection device of any one of Configurations 1 to 7, wherein the plurality of sensors are arranged on the substrate surface so as to be capable of receiving the light incident on the light transmitting body from a necessary direction depending on a detection function.
[Configuration 9] The light detection device of any one of Configurations 1 to 8, wherein the solar radiation sensor includes a plurality of light receivers arranged to be capable of detecting illuminance and an incidence angle of the light incident on the light transmitting body.
[Configuration 10] The light detection device of any one of Configurations 1 to 9, wherein the second illuminance sensor is arranged at a position where the second illuminance sensor is capable of receiving the light incident on the light transmitting body from a wider range than the rain sensor and the solar radiation sensor.
[Configuration 11] The light detection device of any one of Configurations 1 to 10, wherein the rain sensor is arranged at a position where the rain sensor is capable of receiving infrared light reflected by a window of a vehicle when no rain adheres to the window of the vehicle.
[Configuration 12] A light detection system, including:
the light detection device of Configuration 1 including the rain sensor among the at least two sensors;
a light emitter configured to emit infrared light; and
an optical element attached to a window of a vehicle and configured to cause the infrared light generated by the light emitter to be incident on the rain sensor while being reflected by the window,
wherein the plurality of sensors are attached to the window, and
wherein the light emitter and the optical element are provided below the rain sensor.
[Configuration 13] A light detection system, including:
the light detection device of Configuration 2 including the rain sensor among the two sensors;
a light emitter configured to emit infrared light; and
an optical element attached to a window of a vehicle and configured to cause the infrared light generated by the light emitter to be incident on the rain sensor while being reflected by the window,
wherein the plurality of sensors are attached to the window, and
wherein the light emitter and the optical element are provided below the rain sensor.

[Configuration 14] A light detection system, including:
the light detection device of Configuration 3 including the rain sensor among the three sensors;
a light emitter configured to emit infrared light; and
an optical element attached to a window of a vehicle and configured to cause the infrared light generated by the light emitter to be incident on the rain sensor while being reflected by the window,
wherein the plurality of sensors are attached to the window, and
wherein the light emitter and the optical element are provided below the rain sensor.
[Configuration 15] A light detection system, including:
the light detection device of Configuration 4;
a light emitter configured to emit infrared light; and
an optical element attached to a window of a vehicle and configured to cause the infrared light generated by the light emitter to be incident on the rain sensor while being reflected by the window,
wherein the plurality of sensors are attached to the window, and
wherein the light emitter and the optical element are provided below the rain sensor.
[Configuration 16] A light detection system, including:
a light detection device attached to a window of a vehicle;
a light emitter configured to emit infrared light; and
an optical element attached to the window of the vehicle and configured to cause the infrared light generated by the light emitter to be incident on the light detection device while being reflected by the window of the vehicle,
wherein the light detection device includes a rain sensor configured to detect rain according to the infrared light received from the light emitter through the optical element, and
wherein the light emitter and the optical element are provided below the light detection device.
According to such configurations, the light emitter configured to emit infrared light to be received by the rain sensor, and the optical element configured to cause the infrared light generated by the light emitter to be incident on the light detection device while being reflected by the window of the vehicle are provided downward from the light detection device. This prevents the infrared light reflected by the optical element and the like from being incident on the light detection device from above the light detection device. Therefore, it is possible to prevent the infrared light received by the rain sensor from adversely affecting detected values of other sensors.
[Configuration 17] The light detection system of Configuration 16, wherein the light detection device includes:
a plurality of sensors including the rain sensor and provided on a substrate;
a light transmitting body made of a light transmitting resin and configured to cover the substrate and the plurality of sensors; and
a light shielding body configured to cover a periphery of the light transmitting body with a shape that shields the periphery of the light transmitting body from light and including an opening at a position facing a substrate surface of the substrate,
wherein the optical element is provided at a position where the optical element is capable of causing the infrared light generated by the light emitter to be incident into the light transmitting body from outside the light shielding body through the opening while being reflected by the window of the vehicle, and

wherein the plurality of sensors are provided on the substrate surface at positions where the plurality of sensors are capable of receiving light incident into the light transmitting body from outside the light shielding body through the opening.
[Configuration 18] The light detection system of Configuration 17, wherein the plurality of sensors further include a first illuminance sensor configured to detect illuminance according to light received from a certain direction at a front side of the substrate surface among the light incident into the light transmitting body.
[Configuration 19] The light detection system of Configuration 18, wherein the plurality of sensors further include a second illuminance sensor configured to detect illuminance according to light received from a wider direction than the first illuminance sensor among the light incident into the light transmitting body.
[Configuration 20] The light detection system of any one of Configurations 17 to 19, wherein the plurality of sensors further include a solar radiation sensor configured to detect solar radiation according to received light.
[Configuration 21] The light detection system of any one of Configurations 12 to 14, wherein the light shielding body is made of a light shielding resin, and
the light transmitting body and the light shielding body include a structure formed by double molding.
[Configuration 22] The light detection system of any one of Configurations 17 to 21, wherein the light transmitting body includes a lens-shaped structure protruding into the opening of the light shielding body.
[Configuration 23] The light detection system of Configuration 22, wherein a thickness of the opening of the light shielding body is thicker than a thickness of the lens-shaped structure.
[Configuration 24] The light detection system of any one of Configurations 17 to 23, wherein the plurality of sensors are arranged on the substrate surface so as to be capable of receiving the light incident on the light transmitting body from a necessary direction depending on a detection function.
[Configuration 25] The light detection system of any one of Configurations 20 to 24, wherein the solar radiation sensor includes a plurality of light receivers arranged to be capable of detecting illuminance and an incidence angle of the light incident on the light transmitting body.
[Configuration 26] The light detection system of any one of Configurations 19 to 25, wherein the second illuminance sensor is arranged at a position where the second illuminance sensor is capable of receiving the light incident on the light transmitting body from a wider range than the rain sensor.
[Configuration 27] The light detection system of any one of Configurations 16 to 26, wherein the rain sensor is arranged at a position where the rain sensor is capable of receiving infrared light reflected by a window of a vehicle when no rain adheres to the window of the vehicle.
[Configuration 28] A light detection device, including:
a substrate;
a plurality of sensors provided on the substrate;
a light transmitting body made of a light transmitting resin and configured to cover the substrate and the plurality of sensors; and
a light shielding body configured to cover a periphery of the light transmitting body with a shape that shields the periphery of the light transmitting body and including an opening at a position facing a substrate surface of the substrate, wherein the plurality of sensors are provided on the substrate surface at positions where the plurality of sensors are capable of receiving light incident into the light transmitting body from outside the light shielding body through the opening, and wherein the plurality of sensors include:

a first illuminance sensor configured to detect illuminance according to light received from a direction at a front side of the substrate surface among the light incident into the light transmitting body; and a second illuminance sensor configured to detect illuminance according to light received from a wider direction than the first illuminance sensor among the light incident into the light transmitting body.

With such configurations, when equipped with the plurality of optical sensors including the sensor that detects illuminance according to the light received from a direction at the front side of the substrate surface, it is possible to downsize the light detection device 1 and the light detection system 10, facilitate an optical design thereof, and reduce manufacturing costs thereof.

[Configuration 29] The light detection device of Configuration 28, wherein the plurality of sensors further include a rain sensor configured to detect rain according to received light.

[Configuration 30] The light detection device of Configuration 28 or 29, wherein the plurality of sensors further include a solar radiation sensor configured to detect solar radiation according to the received light.

[Configuration 31] The light detection device of any one of Configurations 28 to 30, wherein the light shielding body is made of a light shielding resin, and the light transmitting body and the light shielding body include a structure formed by double molding.

[Configuration 32] The light detection device of any one of Configurations 28 to 31, wherein the light transmitting body includes a lens-shaped structure protruding into the opening of the light shielding body.

[Configuration 33] The light detection device of Configuration 32, wherein a thickness of the opening of the light shielding body is thicker than a thickness of the lens-shaped structure.

[Configuration 34] The light detection device of any one of Configurations 28 to 33, wherein the plurality of sensors are arranged on the substrate surface so as to be capable of receiving the light incident on the light transmitting body from a necessary direction depending on a detection function.

[Configuration 35] The light detection device of Configuration 34, wherein the solar radiation sensor includes a plurality of light receivers arranged to be capable of detecting illuminance and an incidence angle of the light incident on the light transmitting body.

[Configuration 36] The light detection device of Configuration 28, wherein the second illuminance sensor is arranged at a position where the second illuminance sensor is capable of receiving the light incident on the light transmitting body from a wider range than the rain sensor.

[Configuration 37] The light detection device of any one of Configurations 28 to 36, wherein the rain sensor is arranged at a position where the rain sensor is capable of receiving infrared light reflected by a window of a vehicle when no rain adheres to the window of the vehicle.

[Configuration 38] A light detection system, including:

the light detection device of Configuration 28;

a light emitter configured to emit infrared light; and an optical element attached to a window of a vehicle and configured to cause the infrared light generated by the light emitter to be incident on a rain sensor while being reflected by the window, wherein the plurality of sensors are attached to the window, and wherein the light emitter and the optical element are provided below the rain sensor.

The embodiments disclosed herein should be considered to be exemplary in all respects and not limitative. The scope of the present disclosure is defined by the claims rather than the description of the embodiments described above, and is intended include all changes within the meaning and scope equivalent to the claims.

While certain embodiments have been described, these embodiments have been presented by way of example only, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A light detection device, comprising:

a substrate;

a plurality of sensors provided on the substrate;

a light transmitting body made of a light transmitting resin and configured to cover the substrate and the plurality of sensors; and a light shielding body configured to cover a periphery of the light transmitting body with a shape that shields the periphery of the light transmitting body from light and including an opening at a position facing a substrate surface of the substrate, wherein the plurality of sensors are provided on the substrate surface at positions where the plurality of sensors are capable of receiving light incident into the light transmitting body from outside the light shielding body through the opening, wherein the plurality of sensors include:

a first illuminance sensor configured to detect illuminance according to light incident into the light transmitting body;

a solar radiation sensor configured to detect solar radiation according to received light; and a rain sensor configured to detect rain according to received light, and wherein the first illuminance sensor is arranged at a position where the first illuminance sensor is capable of receiving the light incident on the light transmitting body from a wider range than the rain sensor and the solar radiation sensor.

2. The light detection device of claim 1, wherein the plurality of sensors further comprises a second illuminance sensor configured to detect illuminance according to light received from a certain direction at a front side of the substrate among the light incident into the light transmitting body.

3. The light detection device of claim 2, wherein the first illuminance sensor is configured to detect illuminance according to light received from a wider direction than the second illuminance sensor among the light incident into the light transmitting body.

4. A light detection system, comprising:
the light detection device of claim 2;
a light emitter configured to emit infrared light; and
an optical element attached to a window of a vehicle and configured to cause the infrared light generated by the light emitter to be incident on the rain sensor while being reflected by the window,
wherein the plurality of sensors are attached to the window, and
wherein the light emitter and the optical element are provided below the rain sensor.

5. The light detection device of claim 1, wherein the light shielding body is made of a light shielding resin, and
wherein the light transmitting body and the light shielding body include a structure formed by double molding.

6. The light detection device of claim 1, wherein the light transmitting body includes a lens-shaped structure protruding into the opening of the light shielding body.

7. The light detection device of claim 6, wherein a thickness of the opening of the light shielding body is thicker than a thickness of the lens-shaped structure.

8. The light detection device of claim 1, wherein the plurality of sensors are arranged on the substrate surface so as to be capable of receiving the light incident on the light transmitting body from a necessary direction depending on a detection function.

9. The light detection device of claim 1, wherein the solar radiation sensor includes a plurality of light receivers arranged to be capable of detecting illuminance and an incidence angle of the light incident on the light transmitting body.

10. The light detection device of claim 1, wherein the rain sensor is arranged at a position where the rain sensor is capable of receiving infrared light reflected by a window of a vehicle when no rain adheres to the window of the vehicle.

11. A light detection system, comprising:
the light detection device of claim 1;
a light emitter configured to emit infrared light; and
an optical element attached to a window of a vehicle and configured to cause the infrared light generated by the light emitter to be incident on the rain sensor while being reflected by the window,
wherein the plurality of sensors are attached to the window, and
wherein the light emitter and the optical element are provided below the rain sensor.

12. A light detection system, comprising:
a light detection device attached to a window of a vehicle;
a light emitter configured to emit infrared light; and
an optical element attached to the window of the vehicle and configured to cause the infrared light generated by the light emitter to be incident on the light detection device while being reflected by the window of the vehicle,
wherein the light detection device includes:
a substrate;
a plurality of sensors provided on the substrate; and
a light transmitting body made of a light transmitting resin and configured to cover the substrate and the plurality of sensors,
wherein the plurality of sensors include:
a first illuminance sensor configured to detect illuminance according to light incident into the light transmitting body;
a solar radiation sensor configured to detect solar radiation according to received light; and
a rain sensor configured to detect rain according to the infrared light received from the light emitter through the optical element,
wherein the light emitter and the optical element are provided below the light detection device, and
wherein the first illuminance sensor is arranged at a position where the first illuminance sensor is capable of receiving the light incident on the light transmitting body from a wider range than the rain sensor and the solar radiation sensor.

13. The light detection system of claim 12, wherein the light detection device further includes:
a light shielding body configured to cover a periphery of the light transmitting body with a shape that shields the periphery of the light transmitting body from light and including an opening at a position facing a substrate surface of the substrate,
wherein the optical element is provided at a position where the optical element is capable of causing the infrared light generated by the light emitter to be incident into the light transmitting body from outside the light shielding body through the opening while being reflected by the window of the vehicle, and
wherein the plurality of sensors are provided on the substrate surface at positions where the plurality of sensors are capable of receiving light incident into the light transmitting body from outside the light shielding body through the opening.

14. The light detection system of claim 13, wherein the plurality of sensors further include a second illuminance sensor configured to detect illuminance according to light received from a certain direction at a front side of the substrate surface among the light incident into the light transmitting body.

15. The light detection system of claim 14, wherein the first illuminance sensor is configured to detect illuminance according to light received from a wider direction than the second illuminance sensor among the light incident into the light transmitting body.

\* \* \* \* \*